United States Patent
Kocherovsky et al.

(10) Patent No.: US 9,475,132 B2
(45) Date of Patent: Oct. 25, 2016

(54) MULTITEETH INDEXABLE INSERT WITH LOCATING MEANS AND MATERIAL REMOVAL TOOL WITH SAME

(75) Inventors: Yevgeny Kocherovsky, West Bloomfiled, MI (US); Kenneth Noggle, West Bloomfiled, MI (US); Michael Charron, Troy, MI (US)

(73) Assignee: Sandvik, Inc., Fair Lawn, NJ (US)

( * ) Notice: Subject to any disclaimer, the term of this patent is extended or adjusted under 35 U.S.C. 154(b) by 1088 days.

(21) Appl. No.: 13/501,160

(22) PCT Filed: Oct. 14, 2010

(86) PCT No.: PCT/US2010/052619
§ 371 (c)(1),
(2), (4) Date: Apr. 27, 2012

(87) PCT Pub. No.: WO2011/047126
PCT Pub. Date: Apr. 21, 2011

(65) Prior Publication Data
US 2012/0201622 A1 Aug. 9, 2012

Related U.S. Application Data

(60) Provisional application No. 61/251,821, filed on Oct. 15, 2009.

(51) Int. Cl.
*B23C 5/20* (2006.01)
*B23C 5/22* (2006.01)
(Continued)

(52) U.S. Cl.
CPC ............ *B23C 5/06* (2013.01); *B23B 27/1611* (2013.01); *B23B 29/02* (2013.01); *B23C 5/207* (2013.01);
(Continued)

(58) Field of Classification Search
CPC ......... B23C 5/06; B23C 5/22; B23C 5/2234; B23C 5/006; B23C 5/08; B23C 5/207; B23C 2200/0433; B23C 2200/0455; B23C 2200/0477; B23C 2200/085; B23C 2200/121; B23C 2210/168

USPC .......... 407/33, 40, 41, 42, 48, 50, 108, 109, 407/113, 34, 101–103
See application file for complete search history.

(56) References Cited

U.S. PATENT DOCUMENTS

| 889,829 A | 6/1908 | Valentine |
| 1,945,854 A * | 2/1934 | Hall .......................... B23C 5/22 407/39 |

(Continued)

FOREIGN PATENT DOCUMENTS

| CN | 1833801 | 9/2006 |
| CN | 101426607 | 5/2009 |

(Continued)

OTHER PUBLICATIONS

Notice of Reasons for Rejection (and English translation) for Japanese Application No. 2012-534350, dated Aug. 27, 2013.
(Continued)

*Primary Examiner* — Sara Addisu
(74) *Attorney, Agent, or Firm* — Morgan, Lewis & Bockius LLP

(57) ABSTRACT

An indexable cutting insert includes at least two side edges each defining an indexable edge of the insert and at least two cutting teeth are on each indexable edge. The cutting insert includes locating means on a plane of the upper face and/or a plane of the lower face. When mounted on a material removal tool, the locating means cooperate with receivers on the working face of the material removal tool to constrain degrees of freedom of the cutting insert. Further, the mounted cutting inserts each locate the radial edge of the cutting teeth in the active position on a common circumference of a circle centered on an axis of rotation of the material removal tool. A mounting system per see is also disclosed as well as a method of removing material from a workpiece with the material removal tool.

61 Claims, 20 Drawing Sheets

(51) Int. Cl.
  *B23C 5/06* (2006.01)
  *B23B 29/02* (2006.01)
  *B23B 27/16* (2006.01)
  *B23C 5/08* (2006.01)
  *B23C 5/00* (2006.01)

(52) U.S. Cl.
  CPC ........ *B23C 5/2247* (2013.01); *B23B 2200/085* (2013.01); *B23B 2200/121* (2013.01); *B23B 2200/369* (2013.01); *B23B 2270/14* (2013.01); *B23C 5/006* (2013.01); *B23C 5/08* (2013.01); *B23C 5/22* (2013.01); *B23C 5/2234* (2013.01); *B23C 2200/0433* (2013.01); *B23C 2200/0455* (2013.01); *B23C 2200/0477* (2013.01); *B23C 2200/085* (2013.01); *B23C 2200/121* (2013.01); *B23C 2200/168* (2013.01); *B23C 2200/367* (2013.01); *B23C 2210/168* (2013.01); *B23C 2210/66* (2013.01); *Y10T 407/192* (2015.01); *Y10T 407/1924* (2015.01); *Y10T 407/23* (2015.01); *Y10T 409/303752* (2015.01)

(56) References Cited

U.S. PATENT DOCUMENTS

| | | | |
|---|---|---|---|
| 3,512,236 A | 5/1970 | Renaud | |
| 3,792,514 A * | 2/1974 | Ushijima | B23B 27/143 407/113 |
| 4,906,145 A * | 3/1990 | Oliver | B23C 5/2265 407/103 |
| 5,046,899 A * | 9/1991 | Nishi | B23B 27/143 407/102 |
| 5,209,611 A | 5/1993 | Drescher | |
| 5,542,794 A * | 8/1996 | Smith | B23C 5/006 407/35 |
| 5,542,795 A | 8/1996 | Mitchell | |
| 5,586,843 A | 12/1996 | Minicozzi | |
| 5,738,468 A * | 4/1998 | Boianjiu | B23B 27/1618 407/103 |
| 5,810,518 A * | 9/1998 | Wiman | B23B 27/065 407/102 |
| 6,138,540 A * | 10/2000 | Niemi | B23B 27/065 407/113 |
| 6,231,274 B1 * | 5/2001 | Yoneyama | B23C 5/006 407/113 |
| 6,343,898 B1 | 2/2002 | Sjoo et al. | |
| 7,063,487 B2 | 6/2006 | Hessman et al. | |
| 7,121,771 B2 | 10/2006 | Englund | |
| 7,150,590 B2 | 12/2006 | Schafer et al. | |
| 7,156,006 B2 | 1/2007 | Hyatt et al. | |
| 7,175,370 B2 * | 2/2007 | Scherbarth | B23B 5/26 407/103 |
| 7,387,474 B2 | 6/2008 | Edler et al. | |
| 7,510,354 B2 | 3/2009 | Andersson et al. | |
| 7,896,586 B2 * | 3/2011 | Morgulis | B23B 27/065 407/114 |
| 7,909,546 B2 * | 3/2011 | Nada | B23B 27/065 407/113 |
| 8,696,264 B2 * | 4/2014 | Gey | B28B 1/002 407/113 |
| 8,858,130 B2 * | 10/2014 | Morrison | B23C 5/06 407/113 |
| 9,168,595 B2 * | 10/2015 | Heinloth | B23C 5/006 |
| 2004/0253063 A1 | 12/2004 | Murrell | |
| 2005/0214080 A1 | 9/2005 | Satran | |
| 2007/0071561 A1 | 3/2007 | Agic | |
| 2008/0226403 A1 * | 9/2008 | Craig | 407/113 |
| 2011/0103905 A1 * | 5/2011 | Morrison | B23C 5/2213 407/48 |
| 2012/0201622 A1 * | 8/2012 | Kocherovsky et al. | 409/131 |
| 2012/0251250 A1 * | 10/2012 | Morrison | B23B 27/1622 407/42 |
| 2013/0251463 A1 * | 9/2013 | Harif | B23B 27/04 407/11 |
| 2015/0037107 A1 * | 2/2015 | Buob | B23C 5/08 407/44 |
| 2015/0202698 A1 * | 7/2015 | Morrison | B23C 5/2472 407/36 |

FOREIGN PATENT DOCUMENTS

| | | |
|---|---|---|
| DE | 10 2006 028 062 | 12/2007 |
| JP | 61-38811 | 2/1986 |
| JP | 6-190608 | 7/1994 |
| JP | 9-66405 | 3/1997 |
| JP | 2005-501748 | 1/2005 |
| JP | 2006-255883 | 9/2006 |
| JP | 2009-534199 | 9/2009 |
| WO | WO 97/16277 | 5/1997 |
| WO | WO 2004/105988 | 12/2004 |

OTHER PUBLICATIONS

Extended European Search Report for European Application No. 10824076.3, dated Mar. 18, 2013.
Decision of Rejection (with English translation) for Japanese Patent Application No. 2012-534350, dated Mar. 18, 2014.
International Preliminary Report on Patentability for PCT/US2010/052619, dated Apr. 17, 2012.
Written Opinion of the International Search Report for PCT/US2010/052619, Dec. 13, 2010.
Office Action (with English translation) for Chinese Patent Application No. 2010-0055895.9, dated Feb. 26, 2014.
English translation of Office Action for Korean Patent Application No. 10-2012-7012407, dated Mar. 18, 2014.
International Search Report for PCT/US2010/025619 dated Dec. 13, 2010.

\* cited by examiner

MULTITEETH INDEXABLE INSERT WITH LOCATING MEANS AND MATERIAL REMOVAL TOOL WITH SAME

RELATED APPLICATION DATA

The present application is a §371 U.S. National Phase Application of International Application No. PCT/US2010/052619 (filed 14 Oct. 2010) which claims priority under 35 U.S.C. §119(e) to U.S. Provisional Application No. 61/251,821 (filed 15 Oct. 2009).

FIELD

The present disclosure relates to material removal tools and indexable inserts for such tools. In particular, the present disclosure relates to material removal tools for milling, turning, boring and drilling operations which incorporate a plurality of indexable insert arranged at increased density on the tool body by, for example, a mating arrangement controlling the six axes of freedom of the cutting insert by a specific seating structure between cooperating locating means and receivers and/or a mutually interlocking relationship between the indexable inserts.

BACKGROUND

In the discussion of the background that follows, reference is made to certain structures and/or methods. However, the following references should not be construed as an admission that these structures and/or methods constitute prior art. Applicant expressly reserves the right to demonstrate that such structures and/or methods do not qualify as prior art.

Generally, metal removal rates are a function of feed rate and the number of teeth that the cutting tool is capable of incorporating within a given diameter of the tool or other available space on the tool. Generally, longevity of tool life is a function of the number of cutting edges participating in the material removal process. The more cutting edges that are on the tool, the more prolonged the tool life will proportionally be. In addition to increasing tool life and material removal rate, a plurality of cutting edges contributes to reducing the time for cut interruption. This makes cutting smoother and the quality of the surface better. A smoother cut, also, means less wear of machinery.

There are known methods to achieve high density of cutting edges. U.S. Pat. No. 889,829 shows a traditional tool utilizing a solid grinding technique to produce a high density of teeth. It is a simple method. However, regrinding of the tool is expensive and, as a result, the cutter loses its original size. Also, the compatibility of this method with modern cutting materials like carbide, ceramic, PCD and CBN is very unlikely, due to the high cost.

The problems with the traditional tools, such as in U.S. Pat. No. 888,829, was resolved by utilizing indexable cutting inserts with two cutting edges, such as disclosed in U.S. Pat. No. 5,209,611. An example of such a cutting insert is shown in FIG. 1. The cutting insert 2 has two cutting edges 4,6 that are active at each index position of the cutting insert 2. A benefit of this design is an increase in the number of cutting edges in combination with recyclable inserts. This allows using one cutter body with multiple inserts. The cutting insert 2 is located in a cutter body (not shown) in relation to walls 8,10, which generally act as locating surfaces.

Also, there is a very high manufacturing expense of this type of cutter body. Typically, in order to position both cutting edges 4,6, accurately on the same cutting diameter, pockets for the cutting insert 2 in the tool body have to be machined extremely precise. Milling of pockets is made with solid end mills of small diameters, which usually deflect due to the unfavorable ratio between length and diameter. As a result, to increase precision of milling cutters utilizing the cutting insert 2 of FIG. 1, the seating pockets are jig ground, which substantially increase the cost of the body.

SUMMARY

Exemplary embodiments of the disclosed indexable cutting insert and material removal tool incorporate tight interlocking of the indexable cutting inserts. For example, asymmetric positioning of cutting edges relative to the clamping means provides interlocking between two adjacent indexable cutting inserts to allow locating a maximum number of indexable cutting inserts in the smallest diameter. As a result, extremely compact placement of indexable cutting inserts on the circumference of the material removal tool is achieve. This increases the number of active cutting edges on the material removal tool and further improves its performance.

Exemplary embodiments of the disclosed indexable cutting insert and material removal tool incorporate a unique method of locating the indexable cutting inserts in the material removal tool to provide high accuracy of the radial and the axial positioning of the cutting edges as well as to provide a suitable "dish angle". Further, such a feature allows repeatable and accurate interchangeability and indexing of cutting inserts.

An exemplary embodiment of an indexable cutting insert comprises a body including an upper face opposing a lower face and side edges joining the upper face to the lower face, at least two side edges each defining an indexable edge of the insert, a mounting hole extending through the body from the upper face to the lower face, at least two cutting teeth on each indexable edge, and locating means on at least one of a plane of the upper face and a plane of the lower face, wherein each of the at least two cutting teeth includes a cutting plane meeting a side clearance surface at a radial edge and meeting a face clearance surface at a face edge, and a corner surface connecting the side clearance surface and the face clearance surface.

An exemplary embodiment of a material removal tool comprises a tool body having, along a tool axis, a working face opposing a mounting face, the mounting face mountable to a spindle of a machine tool for rotation about the tool axis and the working face having a periphery, a plurality of cutting inserts mounted on the working face via a mounting hole in the working face having a mounting axis, the cutting inserts including at least two side edges each defining an indexable edge of the insert, at least two cutting teeth on each indexable edge, and a plurality of locating means on at least one of a plane of an upper face of the cutting insert and a plane of a lower face of the insert, and a plurality of cutting locations on the working face, each cutting location having a plurality of receivers distributed about the mounting hole and engaged by the plurality of locating means.

An exemplary embodiment of a method of to remove material from a workpiece comprises rotating a material removal tool mounted to a spindle of machine tool, and removing material from the workpiece by contacting a plurality of cutting inserts mounted at on a working face of the material removal tool to the workpiece, wherein the material removal tool includes a tool body having, along a tool axis, the working face opposing a mounting face, the mounting face mountable to the spindle of the machine tool for rotation about the tool axis and the working face having a periphery, wherein the plurality of cutting inserts are mounted on the working face via a mounting hole having a mounting axis, wherein the cutting inserts include at least two side edges each defining an indexable edge of the insert, at least two cutting teeth on each indexable edge, and a plurality of locating means on at least one of a plane of an upper face of the cutting insert and a plane of a lower face of the insert, and wherein a plurality of cutting locations on the working face each have a plurality of receivers distributed about the mounting hole and engaged by the plurality of locating means.

An exemplary embodiment of a mating system for mounting a cutting insert on a body of a material removal tool comprises at least three pairs of cooperating projections and cavities, one of the cooperating projections and cavities in any one pair on the cutting insert and the other of the cooperating projections and cavities in the one pair on the body of the material removal tool, wherein at least five degrees of freedom of the cutting insert are constrained by two pairs of cooperating projections and cavities with at least two cutting teeth in an active, indexed position, the two cutting teeth on the same side edge of the cutting insert, and wherein a radial edge of each of the at least two cutting teeth in the active indexed position are located on a common circumference of a circle centered on an axis of rotation of the material removal tool.

It is to be understood that both the foregoing general description and the following detailed description are exemplary and explanatory and are intended to provide further explanation of the invention as claimed.

BRIEF DESCRIPTION OF THE DRAWING

The following detailed description can be read in connection with the accompanying drawings in which like numerals designate like elements and in which:

FIG. 9 also illustrates this position on a different embodiment of a cutting insert.

FIG. 30 shows several cutting locations and the location of a cross-section of a receiver. FIG. 31 shows a magnified view of the cross-section of receiver as seen along line F-F in FIG. 30. FIG. 32 is a magnified view of detail in the cross-section of the receiver shown in FIG. 31.

DETAILED DESCRIPTION

Exemplary embodiments of indexable cutting inserts comprise, generally, a body with a mounting hole therethrough, at least two cutting teeth on each indexable edge of the insert, and locating means projecting from at least one of a plane of the upper face of the body and a plane of the lower face of the body.

Figure 1:
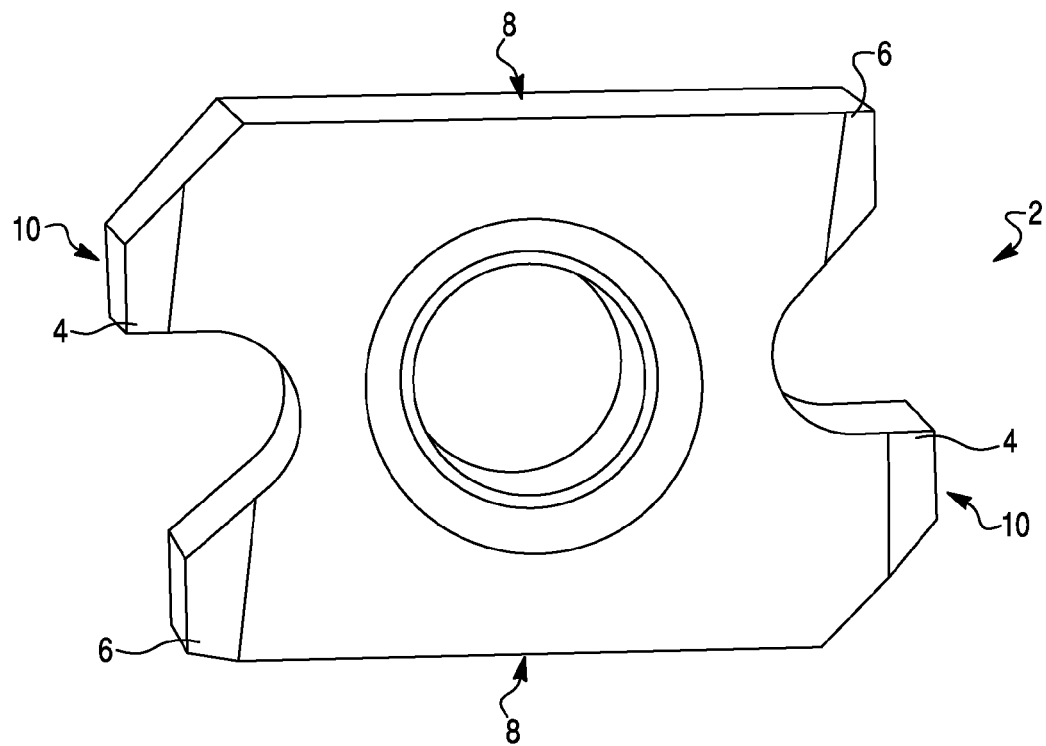
FIG. 1 shows a prior art indexable cutting insert with two cutting edges that are active at each index position.
Figure 2:
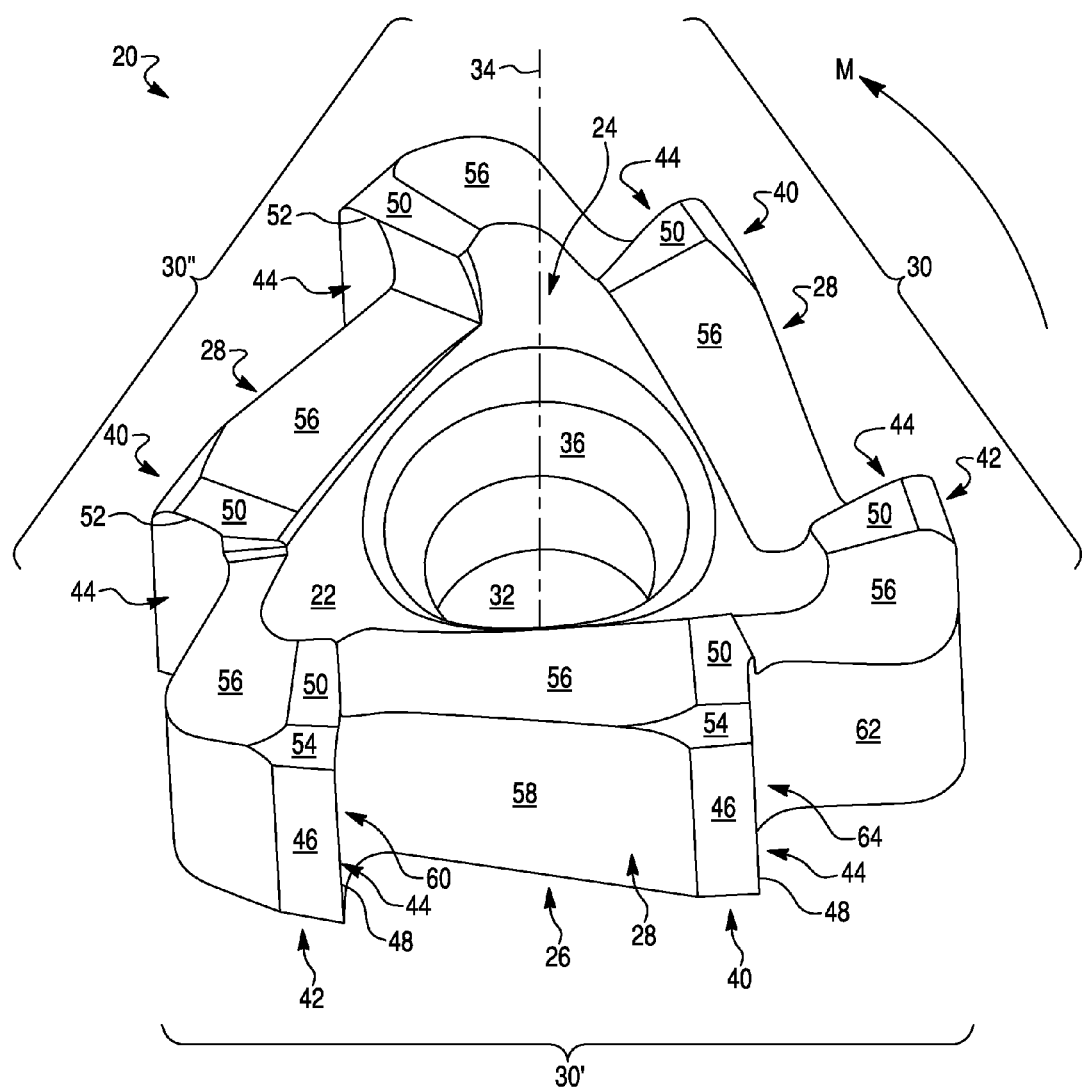
FIG. 2 shows an exemplary embodiment of an indexable cutting insert with three sides and three indexable edges and having two cutting teeth on each indexable edge.

FIG. 2 shows an exemplary embodiment of an indexable cutting insert 20. The body 22 of the cutting insert 20 includes an upper face 24 opposing a lower face 26. Side edges 28 join the upper face 24 to the lower face 26. At least two side edges 28 each define an indexable edge 30 of the insert 20. In the exemplary embodiment shown in FIG. 2, there are three indexable edges 30, 30', 30".

The indexable cutting insert 20 comprises a mounting hole 32 extending through the body 22 from the upper face 24 to the lower face 26 along an axis 34. The mounting hole 32 can have a tapered surface 36 or other oriented surface at an opening thereof to accommodate a correlatingly-shaped surface of a mounting means (not shown), such as a fastener.

At least two cutting teeth 40,42 are positioned on each indexable edge. In reference to a direction of movement M of the cutting insert 20 during operation when mounted on a machine tool, the two cutting teeth 40,42 include a leading tooth 40 and a trailing tooth 42. Each cutting tooth includes a cutting plane 44 meeting a side clearance surface 46 at a radial edge 48 and meeting a face clearance surface 50 at a face edge 52. In some exemplary embodiments, the face edge 52 is oriented at a non-zero dish angle and each radial edge 48 is oriented at a lead angle less than 90 degrees. A corner surface 54 connects the side clearance surface 46 and the face clearance surface 50. The cutting teeth 40,42 are raised above the plane of the upper face 24. The face clearance surface 50 of each cutting tooth 40,42 projects above the plane of the upper face 24. Behind the face clearance surface 50 (relative to the direction of motion M of the cutting insert when mounted on the machine tool), a first tapered surface 56 reduces in height to connect raised portions of the cutting tooth to the upper face 24. Similarly, at least for the leading tooth 42, behind the side clearance surface 46 (relative to the direction of motion M), a second tapered surface 58 tapers radially inward (relative to the axis 34 of the mounting hole 32) to provide a chip removing channel 60 for the trailing tooth 42. Generally, a third tapered surface 62 tapers radially inward (relative to the axis 34 of the mounting hole 32) to provide a chip removing channel 64 for the leading tooth 40.

Although illustrated in FIG. 2 as a three-sided cutting insert with three indexable edges, cutting inserts with more sides, e.g., four sides, five sides, six sides, eights sides, and with more or less indexable edges, e.g., two indexable edges, four indexable edges, five indexable edges, six indexable edges, eight indexable edges, can incorporate the features disclosed herein. FIGS. 3A-3C, 4A-4C and 5A-5E illustrate exemplary embodiments of cutting inserts with different numbers of sides and different number of indexable edges.

Figure 3C:
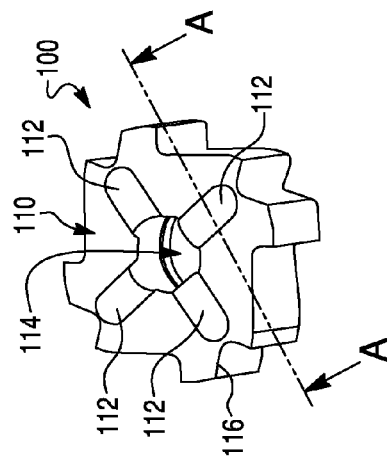
FIGS. 3A to 3C illustrate exemplary embodiments of cutting inserts with four sides and four indexable edges.
Figure 3B:
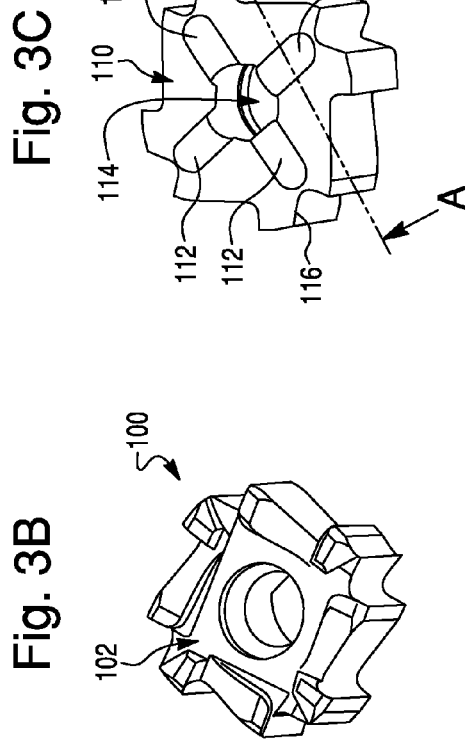
Figure 3A:
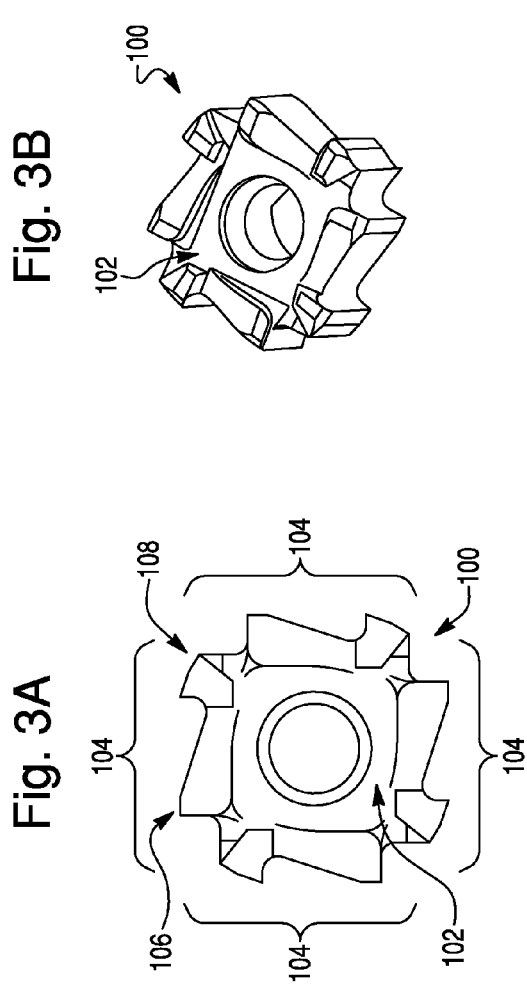

FIGS. 3A to 3C illustrate exemplary embodiments of cutting inserts 100 with four sides and four indexable edges. FIG. 3A is a plan view of the upper face 102. Each indexable edge 104 includes two cutting teeth 106,108 substantially similar to those disclosed in connection with the indexable cutting insert 20 of FIG. 2. FIG. 3B is a perspective view of the upper face 102. FIG. 3C is a perspective view of the lower face 110, which includes locating means 112. In this exemplary embodiment, the locating means 112 are substantially in the form of a rail-shaped structure. The rail-shaped structure is described further herein below. In FIG. 3C, the locating means 112 project across the opening of the mounting hole 114 and terminate in off-set relationship from the peripheral edge 116 of the lower face 110.

Figure 4C:
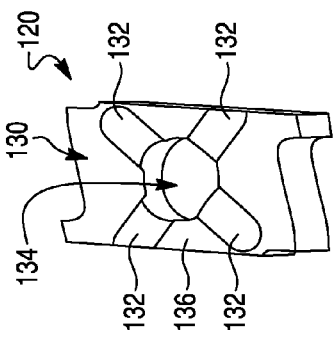
FIGS. 4A to 4C illustrate exemplary embodiments of cutting inserts with four sides and two indexable edges.
Figure 4B:
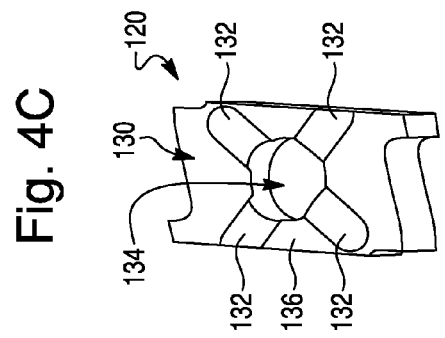
Figure 4A:
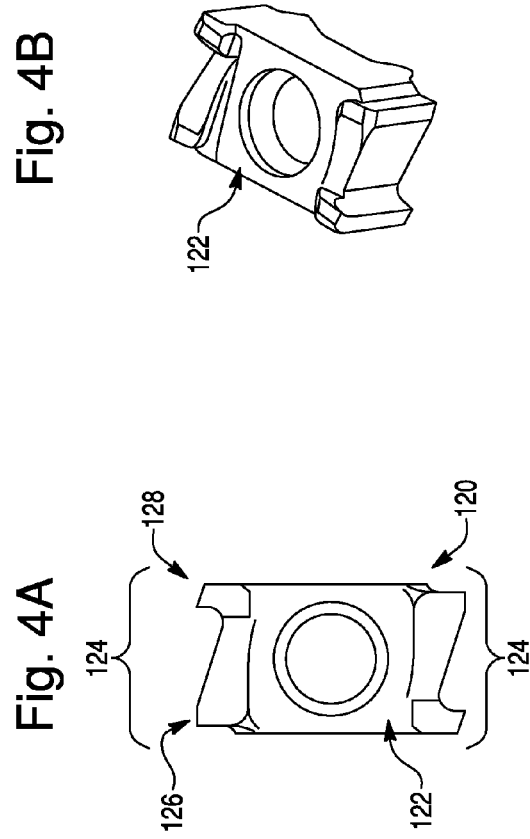

FIGS. 4A to 4C illustrate exemplary embodiments of cutting inserts 120 with four sides and two indexable edges. FIG. 4A is a plan view of the upper face 122. Each indexable edge 124 includes two cutting teeth 126,128 substantially similar to those disclosed in connection with the indexable cutting insert 20 of FIG. 2. FIG. 4B is a perspective view of the upper face 122. FIG. 4C is a perspective view of the lower face 130, which includes locating means 132. In this exemplary embodiment, the locating means 132 are substantially in the form of a rail-shaped structure. The rail-shaped structure is described further herein below. In FIG. 4C, the locating means 132 project across the opening of the mounting hole 134. The locating means 132 in one orientation terminates in an off-set relationship from the peripheral edge 136 of the lower face 130, while the locating means 132 in a second orientation terminates at the peripheral edge 136.

Figure 5A:
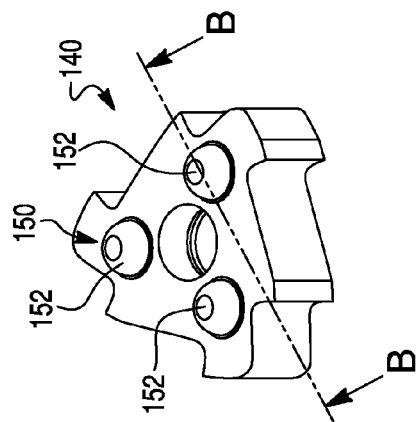
FIGS. 5A to 5E illustrate exemplary embodiments of cutting inserts with three sides and three indexable edges.
Figure 5B:
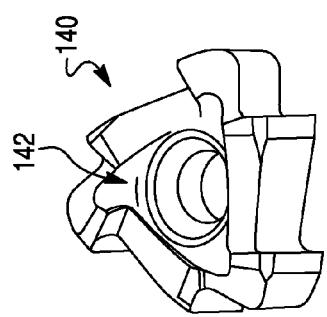
Figure 5C:
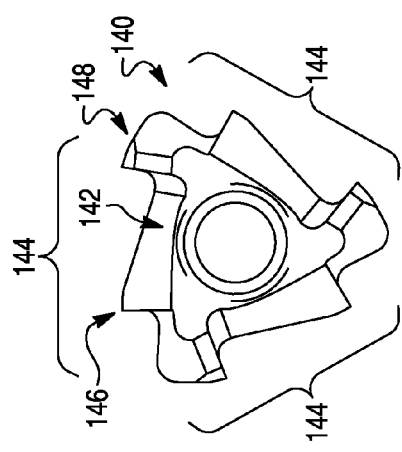
Figure 5D:
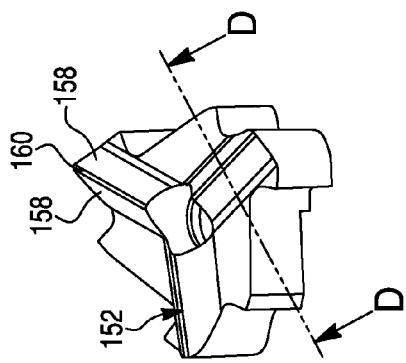
Figure 5E:
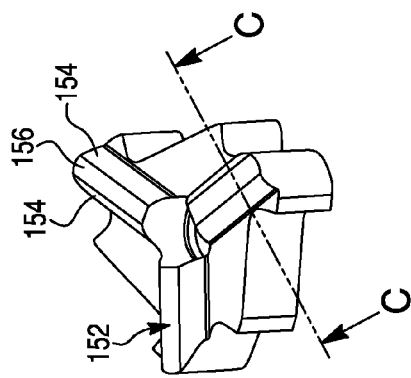

FIGS. 5A to 5E illustrate exemplary embodiments of cutting inserts 140 with three sides and three indexable edges. FIG. 5A is a plan view of the upper face 142. Each indexable edge 144 includes two cutting teeth 146,148 substantially similar to those disclosed in connection with the indexable cutting insert 20 of FIG. 2. FIG. 5B is a perspective view of the upper face 142. FIGS. 5C, 5D and 5E are each a perspective view of the lower face 150, which includes locating means 152. In the exemplary embodiment illustrated in FIG. 5C, the locating means 152 are substantially in the form of a hemispherically-shaped structure. The hemispherically-shaped structure is described further herein below. In the exemplary embodiments illustrated in FIGS. 5D and 5E, the locating means 152 are substantially in the form of a rail-shaped structure. The rail-shaped structures are described further herein below, but the rail-shaped structure in FIG. 5D generally has convex sides 154 with a broad truncated top 156 and the rail-shaped structure in FIG. 5E generally has convex sides 158 (albeit at a different convexity than in FIG. 5D) with a narrow truncated top 160 or with a radiused or non-radiused top from the intersection of the convex sides 158.

As seen in the exemplary embodiments in FIGS. 3C, 4C and 5C-5D, locating means project from a plane of the lower face of the cutting insert. In other exemplary embodiments, the cutting insert can be turned over, e.g., "flipped", in which case locating means as disclosed herein for the lower face can also be included on a plane of the upper face.

FIGS. 6A to 6F are cross-section views of exemplary embodiments of cutting inserts showing the cross-sectional shape of various locating means.

Figure 6A:
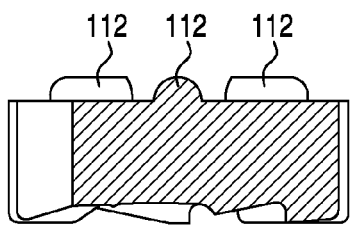
FIGS. 6A to 6F are cross-section views of exemplary embodiments of cutting inserts showing the cross-sectional shape of various locating means.

FIG. 6A is a cross-section view of the exemplary embodiment in FIG. 3C as seen along line A-A. In this exemplary embodiment, the locating means 112 is substantially in the form of a rail-shaped structure that is semi-circular. Alternatively, the rail-shaped structure can be semi-elliptical. In a further alternative form and as shown in FIG. 6E, the rail-shaped structure can be two or more, alternatively a series, of intersecting planar surfaces 118. The rail-shaped structure can be continuously convex in cross-section or can be truncated, particularly at the portion most-projecting from the plane of the face of the cutting insert, i.e., the upper face or the lower face. FIG. 6C is a cross-section view of the exemplary embodiment in FIG. 5D as seen along line C-C. In this exemplary embodiment, the locating means is substantially in the form of a rail-shaped structure that has convex sides 154 with a broad truncated top 156. Alternatively and as shown in FIG. 6D, which is a cross-section view of the exemplary embodiment in FIG. 5E as seen along line D-D, the locating means is substantially in the form of a rail-shaped structure that has convex sides 158 (albeit at a different convexity than in FIG. 6C) with a narrow truncated top 160.

Figure 6B:
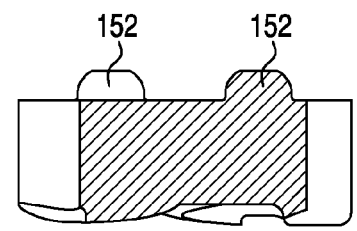
Figure 6C:
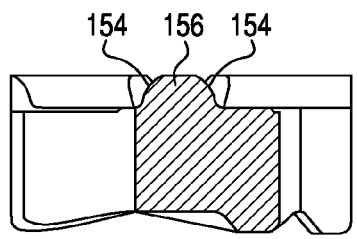
Figure 6D:
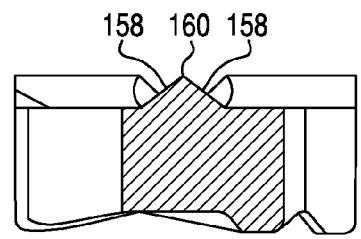
Figure 6E:
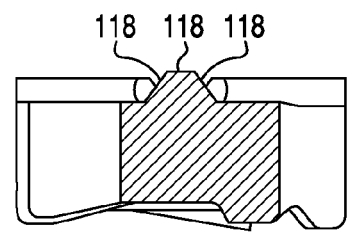
Figure 6F:
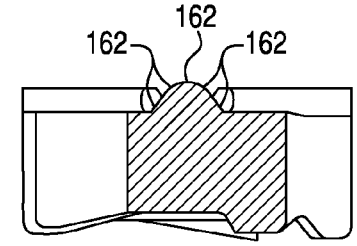

Also in further alternative form and as shown in FIG. 6F, the rail-shaped structure can be semi-polyhedral, with the semi-polyhedral surface, depending on the number of individual sides n, approaching the form of a semi-circle or other convex structure. For the case of a semi-polyhedral, the rail-shaped structure in cross-section can have n sides 162 arranged as in an N-agon, where N is the number of sides of the polyhedral and where 2≤n<N. In the above contexts, the prefix semi means that the shape and arrangement describes some portion of the circumferential surface of the locating means.

In the rail-shaped structures, there can be defined relative to a central axis of the structure, a major radial axis and a minor radial axis. As such, the cross-section views in FIGS. 6A and 6C to 6F show the minor radial axis in the plan view and the major radial axis would be perpendicular to the plan view, e.g., into and out of the paper.

FIG. 6B is a cross-section view of the exemplary embodiment in FIG. 5C as seen along line B-B. In this exemplary embodiment, the locating means 152 is substantially in the form of a hemispherically-shaped structure. This differs from the rail-shaped structure in that all radial distances from a central axis of the hemispherically-shaped structure are substantially the same (in contrast to the rail-shaped structures that have a major radial axis and a minor radial axis). In alternative embodiments, the hemispherically-shaped structure can be a polyhedra-shaped structure, similar to a geodesic dome or a truncated polyhedra-shaped structure.

Figure 7A:
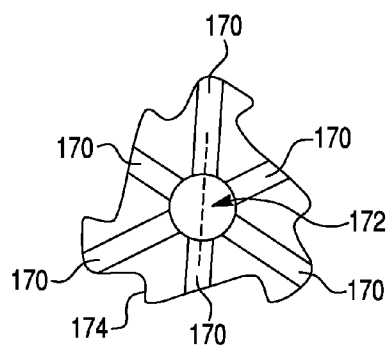
FIGS. 7A and 7B illustrate exemplary embodiments of cutting inserts with rail-shaped structures as locating means in which there are six rail-shaped structure.
Figure 7B:
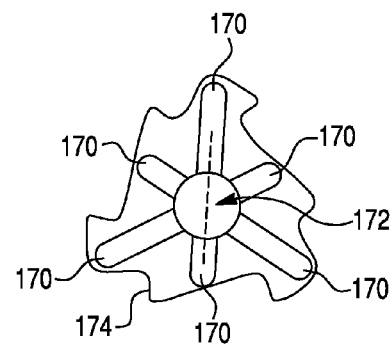

The locating means disclosed herein can vary in number on any one insert as long as the locating means are sufficient to control the position and movement of the cutting insert when mounted on a machine tool as disclosed further herein. Thus, for example, some inserts have three locating means while others have four locating means, while still others have more than three locating means. FIGS. 7A and 7B illustrate exemplary embodiments of cutting inserts with rail-shaped structures as locating means in which there are six rail-shaped structure. In the exemplary embodiments shown, the rail-shaped structures 170 project across the opening of the mounting hole 172. Further, FIG. 7A illustrates the rail-shaped structures extending to the peripheral edge 174 of the face while FIG. 7B illustrates the rail-shaped structure terminating in off-set relationship from the peripheral edge 174 of the face.

Figure 8A:
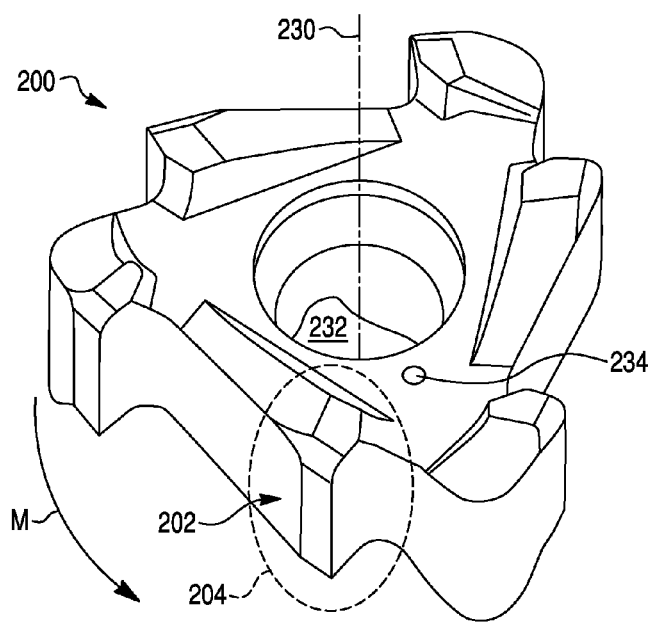
FIG. 8A and its magnified view in FIG. 8B illustrate further features of the cutting surfaces of the cutting insert.
Figure 8B:
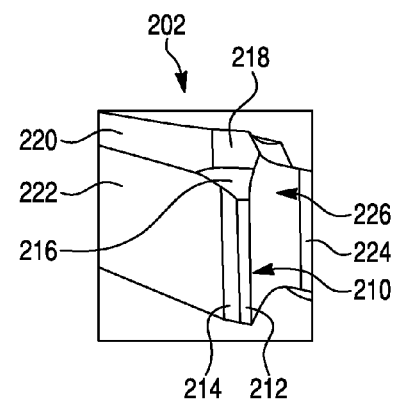

FIG. 8A and its magnified view in FIG. 8B illustrate further features of the cutting surfaces of an exemplary embodiment of a cutting insert 200. For example, the cutting insert 200 has multiple cutting teeth on each indexable edge. One exemplary cutting tooth 202 is illustrated at 204 and in magnified view in FIG. 8B. Similarly to the description of the cutting insert in FIG. 2, the exemplary cutting tooth 202 includes a cutting plane 210 that meets a side clearance surface at a radial edge. In the magnified view, exemplary details of the side clearance surface are shown, including a primary land 212 and a secondary land 214. A corner surface 216 connects the primary land 212 and a secondary land 214 of the side clearance surface and a face clearance surface 218. Behind the face clearance surface 218 (relative to the direction of motion M of the cutting insert when mounted on the machine tool) is a first tapered surface 220, which reduces in height to connect raised portions of the cutting tooth to the upper face of the insert. Exemplary cutting tooth 202 is the leading tooth on the respective indexable edge of insert 200 and behind the side clearance surface (relative to the direction of motion M of the insert 200) is a second tapered surface 222 that tapers radially inward (relative to the axis 230 of the mounting hole 232 of the insert 200) to provide a chip removing channel for the trailing tooth. Generally, a third tapered surface 224 tapers radially inward (relative to the axis 230 of the mounting hole 232) to provide a chip removing channel 226 for the leading tooth, i.e., for cutting tooth 202.

A reference mark, such as the depression 234 on the upper face of the cutting insert in FIG. 8A, can be incorporated to allow a user to monitor the indexing of the cutting insert. Other suitable reference marks other than a depression can be used including, for example, a line, a ridge, and a bump or multiples or combinations thereof.

FIGS. 9 through 12 illustrate various features of the spatial relationships of the two cutting teeth on the indexable side of the cutting insert.

Figure 9:
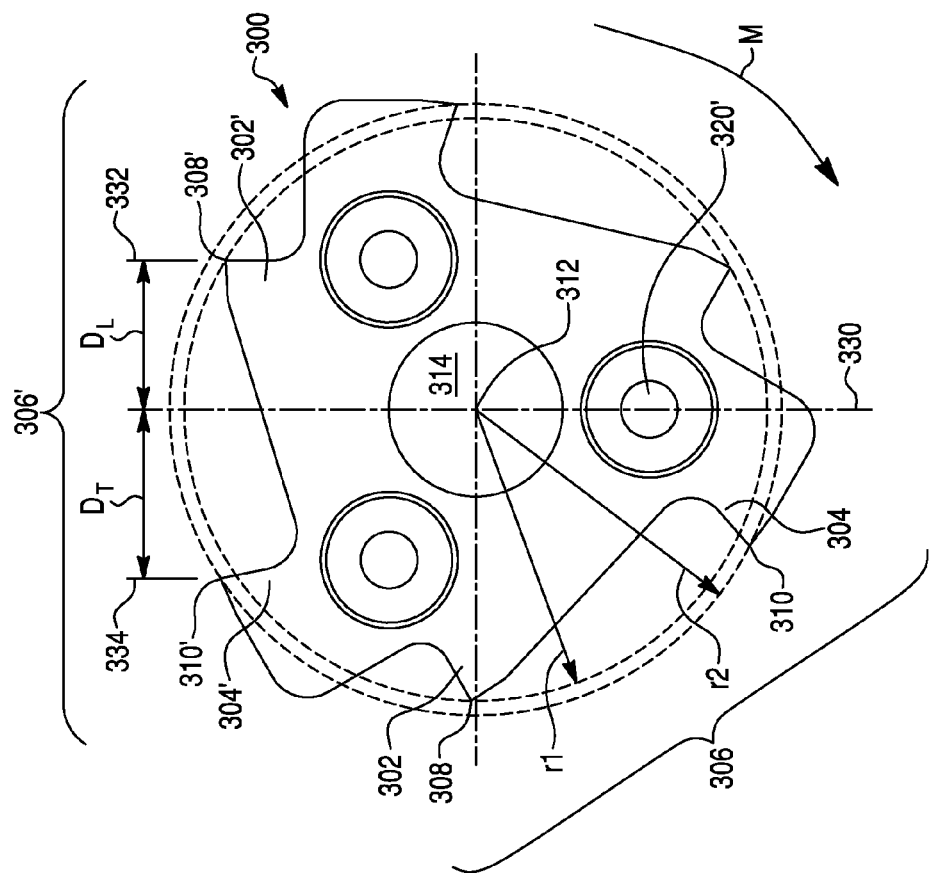
FIG. 9 illustrates the variation in radial position of the leading tooth and trailing tooth on an exemplary embodiment of an indexable side.

FIG. 9 illustrates the variation in radial position of the leading tooth and trailing tooth on an indexable side. For example, FIG. 9 is a view of the cutting insert 300 from a bottom side. There are three indexable edges to the cutting insert 300 each with a leading tooth 302 and a trailing tooth 304 (relative to the direction of motion M of the insert 300). On an indexable edge, for example indexable edge 306, the radial edge 308 of the leading tooth 302 and the radial edge 310 of the trailing tooth 304 are located at different radially distances (r1 and r2, respectively) relative to an axis 312 of the cutting insert 300 located at a center of the mounting hole 314.

Figure 10:
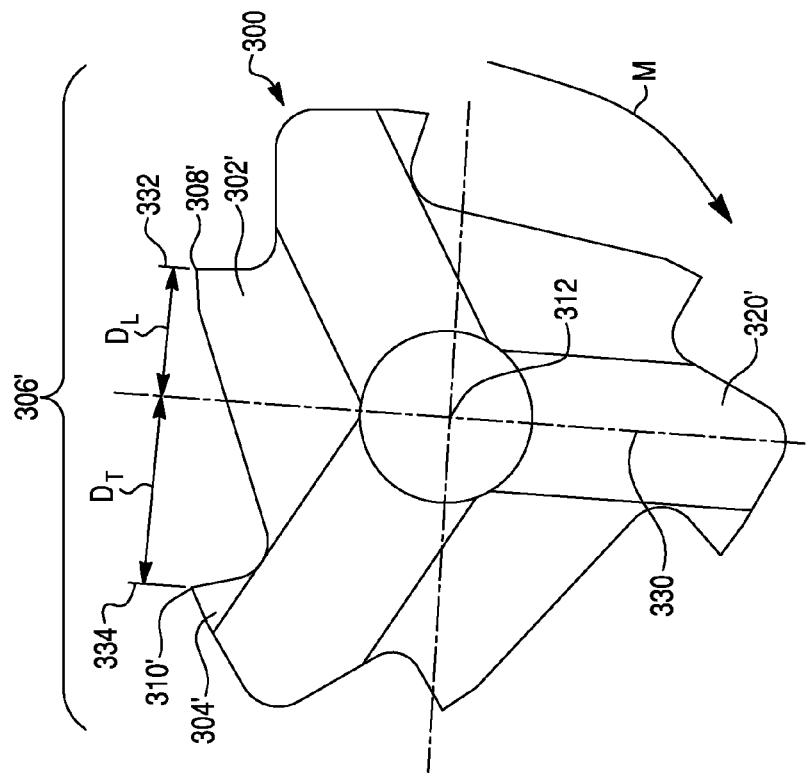
FIG. 10 illustrates the position on the indexable side of a three-sided cutting insert of a leading tooth and a trailing tooth relative to a line or plane that includes both the axial center of the mounting hole and the bisector of the locating means positioned remote from the respective indexable side.

FIGS. 9 and 10 also illustrate the position on the indexable side of a three-sided cutting insert of a leading tooth and a trailing tooth relative to a line (or plane containing the line, i.e., in a plane into and out of the plane of the figure) that includes both the axial center of the mounting hole and the bisector of the locating means positioned remote from the respective indexable side. For example, when viewing the bottom side of the cutting insert 300 as in FIGS. 9 and 10, one locating means 320' is remote from an indexable edge 306' and separated from the indexable edge 306' by the mounting hole 314. In both FIGS. 9 and 10, a line 330 bisects the remote locating means 320' and the axis 312 of the cutting insert 300. This line 330 also projects through the respective indexable edge 306' and, by doing so, separates the leading tooth 302' from the trailing tooth 304' (relative to the direction of motion M of the insert 300). The radial edge 308' of the leading tooth 302' and the radial edge 310' of the trailing tooth 304' are located at different distances from the line 330. These distances are measured perpendicular to the line 330. The distance $D_L$ to the leading tooth 302' is the distance (measured perpendicular to the line 330) from the line 330 to a line 332 that is parallel to the bisecting line 330 and intersects the radial edge 308' of the leading tooth 302'. The distance $D_T$ to the trailing tooth 304' is the distance (measured perpendicular to the line 330) from the line 330 to a line 334 that is parallel to the bisecting line 330 and intersects the radial edge 310' of the trailing tooth 304'. In exemplary embodiments, the distance $D_L$ is less than distance $D_T$.

In alternative embodiments, the leading tooth 302' and trailing tooth 304' are positioned at different distances $D_L$, $D_T$ relative to the line 330 (or plane containing the line, i.e., in a plane into and out of the plane of the figure) and the locating means 320, 320" (other than the remote locating means 320') are also asymmetrically positioned on either side or and relative to the line 330 (or plane).

Dimensions $D_L$ and $D_T$ can be varied and be different from each other to optimize interlocking of inserts and radial overlapping as discussed further herein below in connection, for example, with FIGS. 25-27 and 34-35.

The relationships described above apply to all odd-sided cutting inserts. For even-sided cutting inserts, the plane includes both the axial center of the mounting hole and bisects an angle between two locating means remote from the indexable edge on which the leading tooth and trailing tooth of concern are located.

Figure 11:
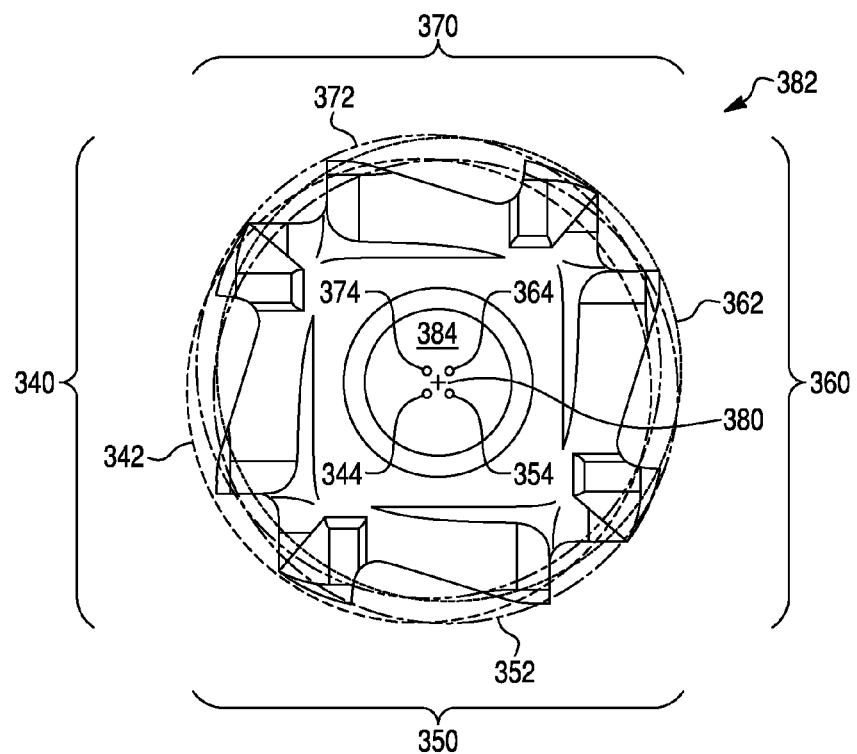
FIG. 11 illustrates an exemplary embodiment of a cutting insert with four indexable edges and radial positioning of features on the indexable edge.

FIG. 11 illustrates an exemplary embodiment of a cutting insert with four indexable edges 340, 350, 360, 370 and radial positioning of features on the indexable edge. An example of these indexable edges were previously shown and described, for example, in connection with FIG. 3A above. Each of the indexable edges have a leading tooth and a trailing tooth. Each of the leading tooth and the trailing tooth have a radial edge, as shown and described, for example, in connection with FIG. 2 above.

FIG. 11 illustrates the radial positioning of the radial edges of the leading tooth and trailing tooth on any one indexable edge. For example, the radial edges of the leading tooth and the trailing tooth of a first indexable edge 340 both lie on the circumference of a first circle 342 having a first axis 344. Likewise, the radial edges of the leading tooth and the trailing tooth of a second indexable edge 350 both lie on the circumference of a second circle 352 having a second axis 354; the radial edges of the leading tooth and the trailing tooth of a third indexable edge 360 both lie on the circumference of a third circle 362 having a third axis 364; and the radial edges of the leading tooth and the trailing tooth of a fourth indexable edge 370 both lie on the circumference of a fourth circle 372 having a fourth axis 374.

FIG. 11 also illustrates the relationship between the radial positioning of the radial edges of the leading tooth and trailing tooth on different indexable edges. For example, the circles 342, 352, 362, 372 associated with the radial edge of the cutting teeth on different indexable edges 340, 350, 360, 370 have the same diameter and are located at a different center point, i.e. axis 344, 354, 364, 374. The four axes 344, 354, 364, 374 are located at different positions from each other and also are radially offset from the axis 380 of the cutting insert 382 located at a center of the mounting hole 384.

Figure 12:
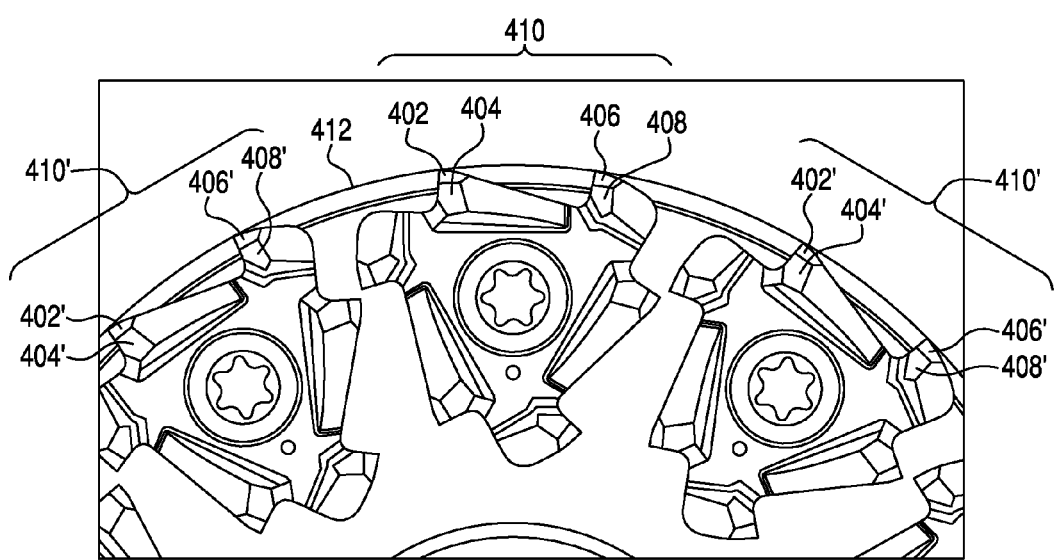
FIG. 12 shows a plurality of exemplary embodiments of cutting inserts mounted on the working face of a material removal tool.

FIG. 12 illustrates the common circumference of a circle on which the leading tooth and trailing tooth of the indexed, indexable edge of exemplary embodiments of cutting inserts both lie when mounted on a working face of a material removal tool. The above-noted circle is centered at the rotational axis of the material removal tool. For example, when mounted, the radial edge 402 of the leading tooth 404 and the radial edge 406 of the trailing tooth 408 on one indexable edge 410 located in the indexed position both lie on a circumference of a circle 412. Moreover, the radial edge 402' of the leading tooth 404' and the radial edge 406' of the trailing tooth 408' on an adjacent one indexable edge 410' located in the indexed position both lie on a circumference of the same circle 412. In alternative embodiments, for all of the mounted cutting inserts, the radial edge of the leading tooth and the radial edge of the trailing tooth on each indexable edge located in the indexed position both lie on a circumference of the same circle.

It should be noted that radial edges on two cutting teeth can be located on a common circumference of a circle having any diameter. However, once one requires that a third point of that cutting insert be also on the same common circumference, one effectively defines a diameter of a unique circle. Thus, by constraining only two locations, e.g., radial edges of two cutting teeth, the present disclosure is universally applicable to any number of circles and, by extension, any number of material removal tools with different sizes of diameters.

Figure 13:
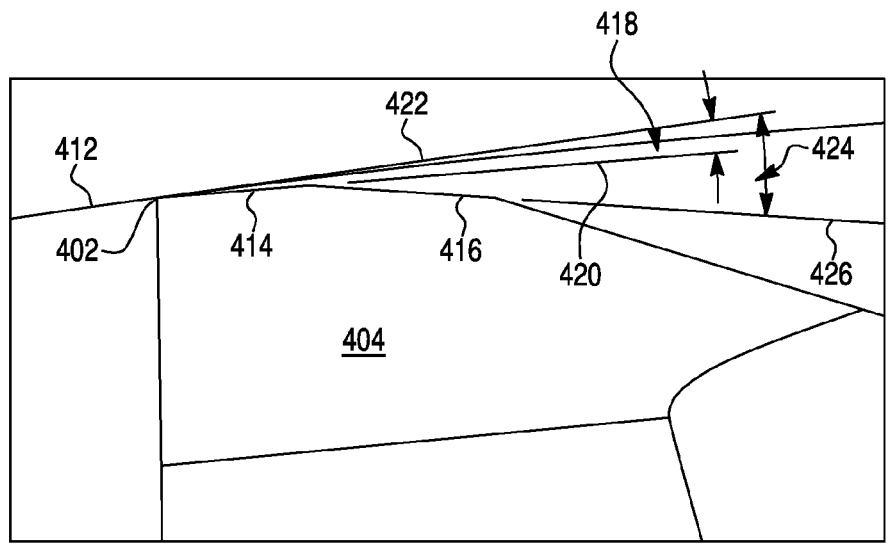
FIG. 13 is a magnified view showing a radial edge of a leading tooth of an indexable edge positioned on the circumference of a circle.

FIG. 13 is a magnified view showing a radial edge 402 of a leading tooth of an indexable edge positioned on the circumference of a circle 412. A similar figure can be made for the radial edge of the trailing tooth. Also shown in FIG. 13 are the primary land 414 and the secondary land 416, each of which has an associated angle. For example, there is a primary angle 418 between a plane 420 containing the primary land 414 and a plane 422 tangent to the circle 412 and containing the radial edge 402. An example of a value of the primary angle 418 is about 2°. Also for example, a secondary angle 424 between a plane 426 containing the secondary land 416 and the plane 422 tangent to the circle 412 and containing the radial edge 402. An example of a value of the secondary angle 424 is about 10°. It should be noted that inclusion of the secondary angle is more suitable for boring tool embodiments and may be eliminated for milling tool embodiments.

Exemplary embodiments of cutting inserts, such as, for example, a milling insert, a boring insert, a drilling insert, or a turning insert, can be mounted on the working face of a material removal tool.

Figure 14:
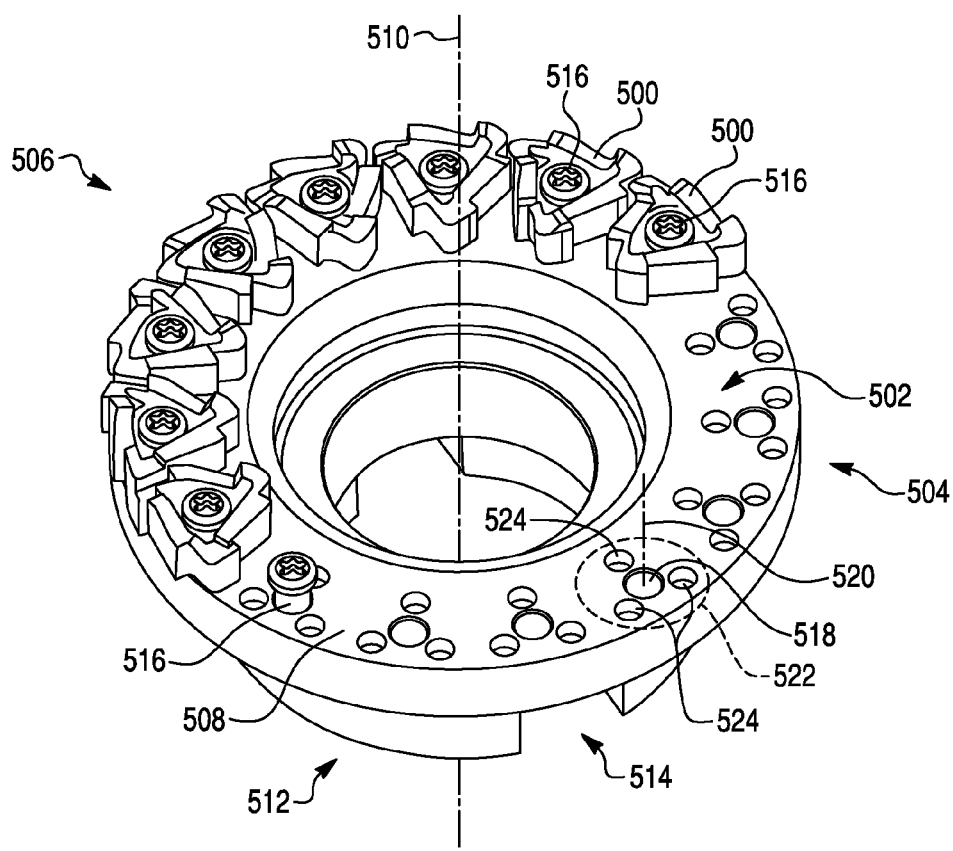
FIG. 14 shows a plurality of exemplary embodiments of cutting inserts mounted on the working face of a first exemplary embodiment of material removal tool.

FIG. 14 shows a plurality of exemplary embodiments of cutting inserts 500 mounted on the working face 502 of a tool body 504 of a first exemplary embodiment of a material removal tool 506. The working face 502 has a periphery 508 and outwardly opposes along a tool axis 510 a mounting face 512, which is mountable via a connector 514 to a spindle of a machine tool (not shown) for rotation about the tool axis 510. The connector 514 can take any suitable form that allows attachment to a desired machine tool, e.g., attachment to a spindle of the machine tool.

The cutting inserts 500 can be as any exemplary embodiments described and disclosed herein and can include at least two side edges each defining an indexable edge of the insert, at least two cutting teeth on each indexable edge, and a plurality of locating means projecting from at least one of a plane of an upper face of the cutting insert and a plane of a lower face of the insert. The cutting inserts 500 are mounted via a mounting connector 516 that passes through or threads with the mounting hole of the cutting insert 500 and engages with a mounting hole 518 in the working face 502. The mounting hole in the cutting insert 500 (an example of which can be seen in FIGS. 2-5E along with an associated mounting axis, such as axis 34 in FIG. 2) is suitably adapted to receive the mounting connector 516. For example, the mounting hole in the cutting insert can be threaded to receive a threaded connector; recessed or sloped to correlate to a head or shoulder geometry on a connector; clamped with a clamping connector; or have a combination of two or more of these features. In the exemplary embodiment of FIG. 14, the mounting connector 516 is a cap screw with a threaded body and a sloped head which is recessed into the cutting insert 500. Similarly, the mounting hole 518 in the working face 502 has a mounting axis 520 and is a suitably adapted to receive the mounting connector 516. For example, the mounting hole in the working face can be threaded to receive a threaded connector; recessed or sloped to correlate to a head or shoulder geometry on a connector; clamped with a clamping connector; or have a combination of two or more of these features.

Figure 15:
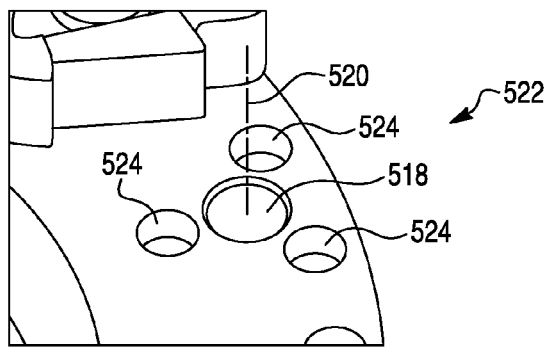
FIG. 15 shows a magnified view of a cutting location.
Figure 16:
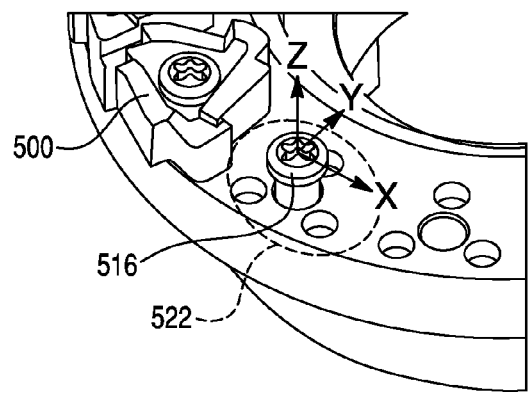
FIG. 16 illustrates a cutting location in which is positioned a mounting connector.

The working face 502 includes a plurality of cutting locations 522. Each cutting location 522 includes a plurality of receivers 524 distributed about the mounting hole 518 in the working face 502. FIG. 15 shows a magnified view of a cutting location 522. The shape and form of the receivers 524 generally correlate to the shape and form of the locating means that project from a plane of the insert 500. FIG. 16 illustrates a cutting location 522 in which is positioned a mounting connector 516. Superimposed on the cutting location 522 in FIG. 16 is an orthogonal set of axes for reference.

Figure 17:
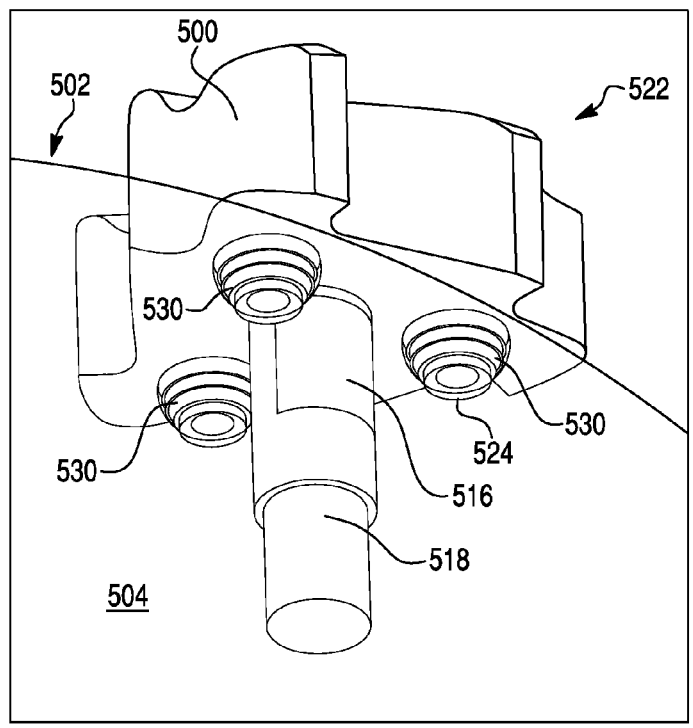
FIG. 17 shows a cutting location as seen from an offset location below the working face in which the tool body is semi-transparent to show details of the mating between the cutting insert and the working face.

FIG. 17 shows a cutting location 522 as seen from an offset location below the working face 502 in which the tool body 504 is semi-transparent to show details of the mating between the cutting insert 500 and the working face 502. A plurality of locating means 530 projecting from, in this exemplary embodiment, a plane of a lower face of the insert 500 are each positioned, respectively in one of the plurality of receivers 524 distributed about the mounting hole 518 in the working face 502. In this exemplary embodiment, the locating means 530 are in the form of a hemispherically-shaped structure. Also visible in FIG. 17 is the mounting connector 516, which is positioned through the mounting hole in the cutting insert 500 and into the mounting hole 518 in the working face 502.

Figure 18:
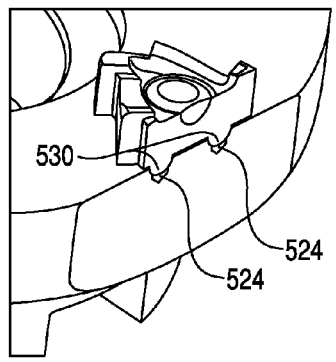
FIG. 18 is a sectioned view of a cutting inserted mounted in a cutting location.
Figure 19:
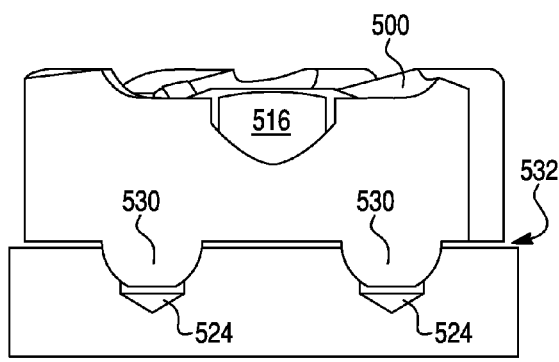
FIG. 19 is a magnified view of the section in FIG. 18.
Figure 20:
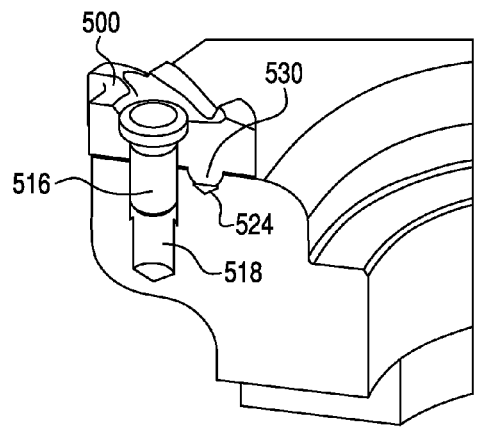
FIG. 20 is a second sectioned view of a cutting inserted mounted in a cutting location.
Figure 21:
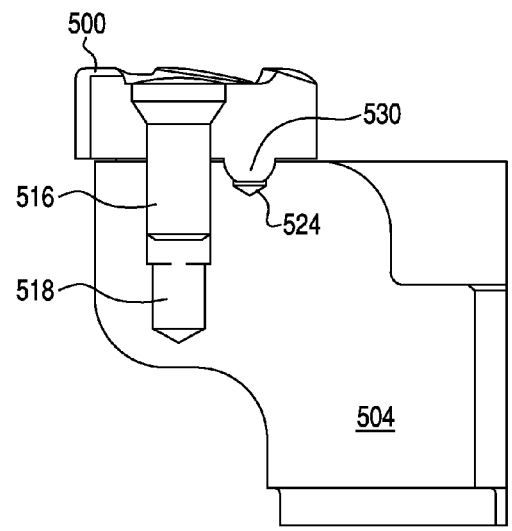
FIG. 21 is a magnified view of the section in FIG. 20.

FIG. 18 is a sectioned view of a cutting inserted mounted in a cutting location. The sectioned view is along an arc of the tool body that includes two locating means 530 positioned in their respective receiver 524. FIG. 19 is a magnified view of the section in FIG. 18. As seen in FIG. 19, the cooperating surfaces of the locating means 530 and the receivers 524 can result in a space 532 between the bottom surface of the insert 500 and the working face 502. This space 532 prevents the bottom surface of the insert 500 from contacting the working face 502. A suitable size of the space, e.g., separation distance between the bottom surface of the insert 500 and the working face 205 is about 0.5 to 3 mm. FIG. 20 is a second sectioned view of a cutting inserted mounted in a cutting location. The sectioned view is along a radius of the tool body 504 that includes one locating means 530 positioned in its respective receiver 524 and the mounting connector 516. FIG. 21 is a magnified view of the section in FIG. 20. In the aggregate, FIGS. 18-21 show examples of the mating between the locating means of the cutting insert positioned in their respective receiver of a cutting location and also show an example of the mounting connector.

Figure 22:
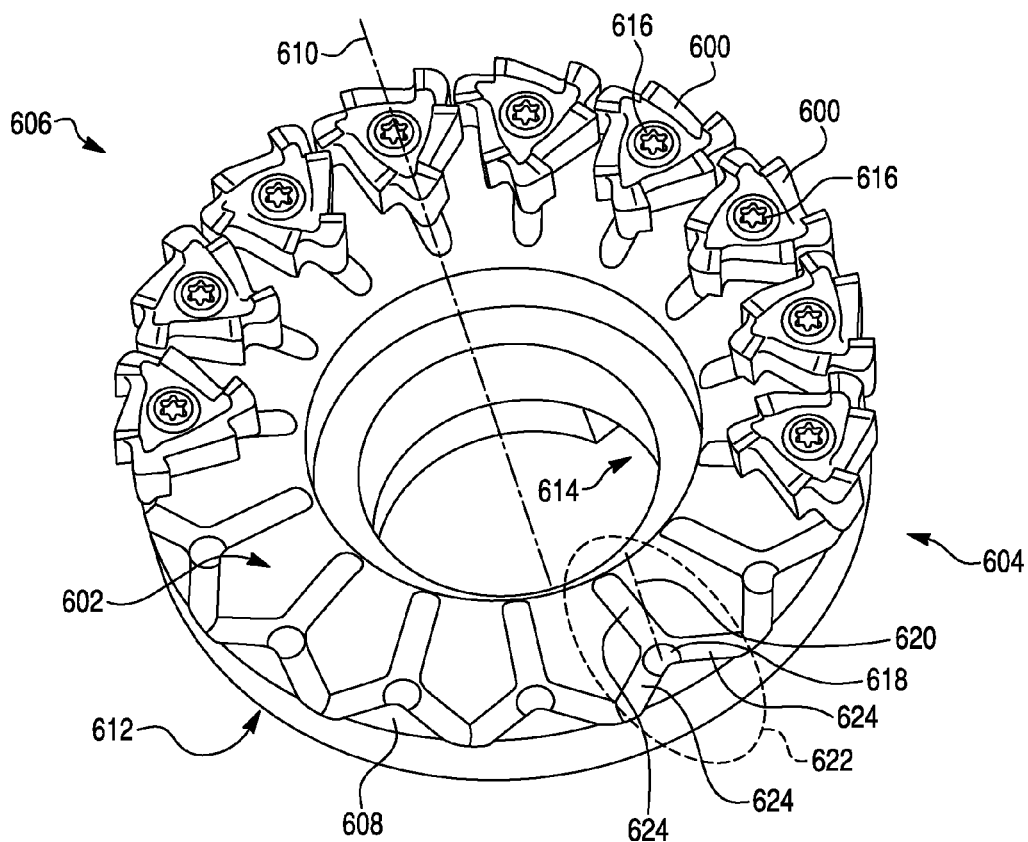
FIG. 22 shows a plurality of exemplary embodiments of cutting inserts mounted on the working face of a second exemplary embodiment of material removal tool.

FIG. 22 shows a plurality of exemplary embodiments of cutting inserts 600 mounted on the working face 602 of a tool body 604 of a second exemplary embodiment of material removal tool 606. The working face 602 has a periphery 608 and outwardly opposes along a tool axis 610 a mounting face 612, which is mountable via a connector 614 to a spindle of a machine tool (not shown) for rotation about the tool axis 610. The connector 614 can take any suitable form that allows attachment to a desired machine tool, e.g., attachment to a spindle of the machine tool.

The cutting inserts 600 can be as any exemplary embodiments described and disclosed herein and can include at least two side edges each defining an indexable edge of the insert, at least two cutting teeth on each indexable edge, and a plurality of locating means projecting from at least one of a plane of an upper face of the cutting insert and a plane of a lower face of the insert. The cutting inserts 600 are mounted via a mounting connector 616 that passes through or threads with the mounting hole of the cutting insert 600 and engages with a mounting hole 618 in the working face 602. The mounting hole in the cutting insert 600 (an example of which can be seen in FIGS. 2-5E along with an associated mounting axis, such as axis 34 in FIG. 2) is suitably adapted to receive the mounting connector 616. For example, the mounting hole in the cutting insert can be threaded to receive a threaded connector; recessed or sloped to correlate to a head or shoulder geometry on a connector; clamped with a clamping connector; or have a combination of two or more of these features. In the exemplary embodiment of FIG. 22, the mounting connector 616 is a cap screw with a threaded body and a sloped head which is recessed into the cutting insert 600. Similarly, the mounting hole 618 in the working face 602 has a mounting axis 620 and is a suitably adapted to receive the mounting connector 616. For example, the mounting hole in the working face can be threaded to receive a threaded connector; recessed or sloped to correlate to a head or shoulder geometry on a connector; clamped with a clamping connector; or have a combination of two or more of these features.

The working face 602 includes a plurality of cutting locations 622. Each cutting location 622 includes a plurality of receivers 624 distributed about the mounting hole 618 in the working face 602. The shape and form of the receivers 624 generally correlate to the shape and form of the locating means that project from a plane of the insert 600.

Figure 23:
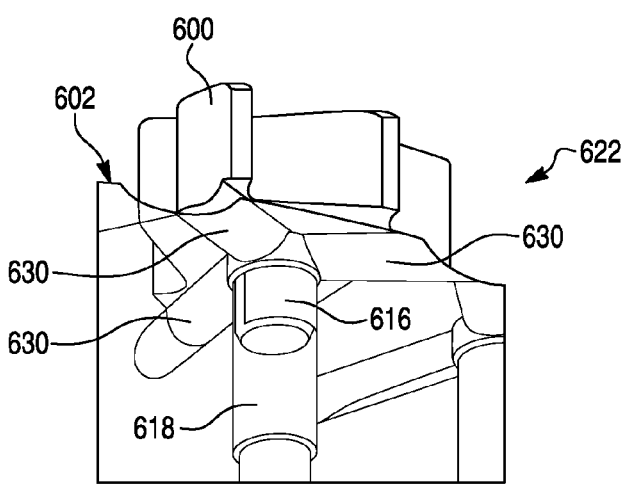
FIG. 23 shows a cutting location as seen from an offset location below the working face in which the tool body is semi-transparent to show details of the mating between the cutting insert and the working face.

FIG. 23 shows a cutting location 622 as seen from an offset location below the working face 602 in which the tool body 604 is semi-transparent to show details of the mating between the cutting insert 600 and the working face 602. A plurality of locating means 630 projecting from, in this exemplary embodiment, a plane of a lower face of the insert 600 are each positioned, respectively in one of the plurality of receivers 624 distributed about the mounting hole 618 in the working face 602. In this exemplary embodiment, the locating means 630 are in the form of a rail-shaped structure. Also visible in FIG. 23 is the mounting connector 616, which is positioned through the mounting hole in the cutting insert 600 and into the mounting hole 618 in the working face 602.

It is known from the theory of kinematics that every solid object has six degrees of freedoms—there are three linear motions in the X-direction, Y-direction and Z-direction and three rotations around the X-axis, Y-axis and Z-axis. To more accurately define the position of solid body, all six degrees of freedom have to be controlled. The cutting insert and material removal tool disclosed herein incorporate features and a mating system that controls all six degrees of freedom. The following description and referenced figures are used to describe how the disclosed locating means and receivers cooperate to control the degrees of freedom available to the cutting insert.

Figure 24:
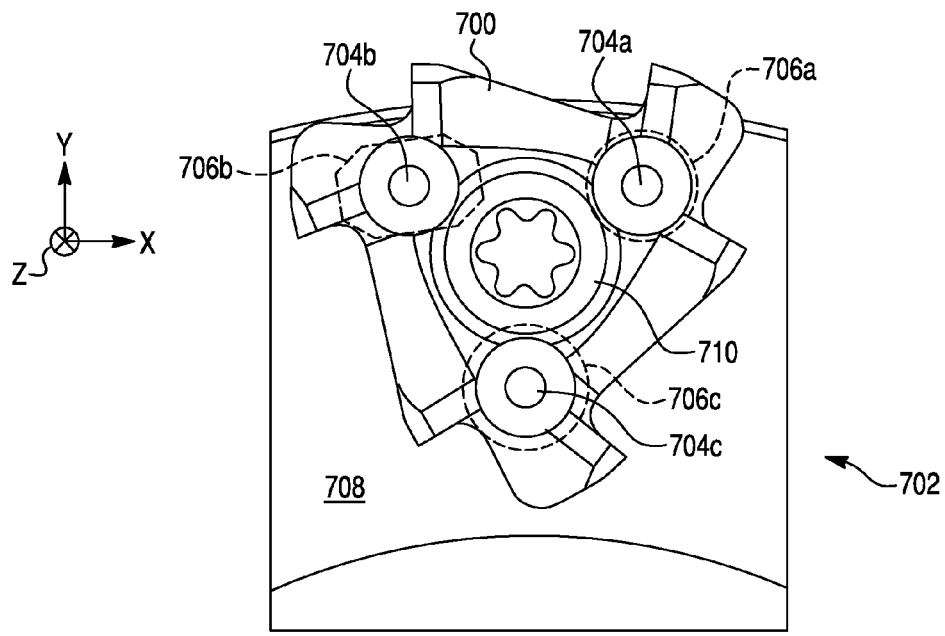
FIG. 24 is an idealized view of a cutting insert showing an exemplary embodiment of the mating system.

FIG. 24 is an idealized view of a cutting insert showing the mating system. In FIG. 24, the cutting insert 700 is in a cutting location on the tool body 702. The cutting insert 700 is semi-transparent to allow viewing of both the locating means 704 projecting from, in this exemplary embodiment, a plane of a lower face of the insert 700 and the plurality of receivers 706 distributed about the mounting hole in the working face 708. In FIG. 24, the head of the mounting connector 710 is visible in the mounting hole.

For purposes of discussion, the three shown locating means 704 are referred to and labeled as 704a, 704b and 704c; likewise the three shown receivers 706 (depicted by dashed lines in FIG. 24) are referred to and labeled as 706a, 706b and 706c. The locating means 704 that cooperate with and mate with the receiver 706 have the same alphabetic suffix. Of course the cutting insert is indexable, so upon indexing the alphabetic suffix designation of any one of the locating means 704 will change in a manner that corresponds to the indexing. Also for purposes of discussion, an orthogonal set of axes are shown (where the Z-axis projects out of the plane of the paper). As referred to below, the orthogonal set of axes are centered on the mounting axis of the mounting hole in the working face for the mounting connector 710.

As seen in FIG. 24, the three locating means 704 are uniformly shaped (in this exemplary embodiment, in the form of a hemispherically-shaped structures) and the three receivers 706 are not uniformly shaped. The shape and size relationship between the correlated locating means 704 and receivers 706 fixes various degrees of freedom.

For example, a first receiver 706a is a cavity that is, in exemplary embodiments, substantially circular and has a diameter that is substantially the same as the diameter of the hemispherically-shaped structure of the first locating means 704a at the desired depth of penetration of the first locating means 704a into the first receiver 706a, i.e., the diameter of the circle designated by the contact of the hemispherically-shaped structure with the periphery of the cavity of the first receiver. When the first locating means 704a is positioned in the first receiver 706a, several degrees of freedom are consequentially fixed. Both linear translation of the insert 700 in the X-axis and in the Y-axis is prevented. Also, linear translation of the insert 700 in the Z-axis (normal to plane X-Y) (outside of removing the insert from the cutting location) is prevented.

Also for example, a second receiver 706b is a cavity that, in exemplary embodiments, has substantially parallel sides and semicircular joining ends. The separation distance between the parallel sides and the size of the diameter of the semi-circular ends are, in exemplary embodiments, substantially the same as the diameter of the hemispherically-shaped structure of the second locating means 704b at the desired depth of penetration of the second locating means 704b into the second receiver 706b. Further, the cavity of the second receiver 706b can be viewed as an elongated slot with a semi-circular cross-section. The shape and orientation of the second receiver 706b allows for self-location of the second locating means 704b and accommodates manufacturing tolerances in the position of the second locating means 704b on the insert 700. When the second locating means 704b is positioned in the second receiver 706b (and in view of the positioning of the first locating means 704a above), two further degrees of freedom are consequentially fixed—both rotation of the insert 700 about the Y-axis and about the Z-axis are prevented.

In additional example, a third receiver 706c is a cavity that, in exemplary embodiments, is substantially circular (or slightly elliptical) and has a diameter (or length of both a major axis and a minor axis) that is greater than the diameter of the hemispherically-shaped structure of the third locating means 704c at the desired depth of penetration of the third locating means 704c into the third receiver 706c. It is contemplated that the third locating means 704c may not have any contact with the periphery or mouth of the third receiver 706c, but rather that the third locating means 704c projects into the third receiver 706c until it contacts a portion of the bottom of the third receiver 706c. When the third locating means 704c is positioned in the third receiver 706c (and in view of the positioning of the first locating means 704a and the second locating means 704b above), a further degree of freedom is consequentially fixed—rotation of the insert 700 about the X-axis is prevented.

Based on the role the differently shaped receivers play (in cooperation with the locating means) in positioning the insert 700, they can also be referred to as (i) a locating receiver (706a), (ii) an aligning receiver (706b), and (iii) a supporting receiver (706c).

Figure 25:
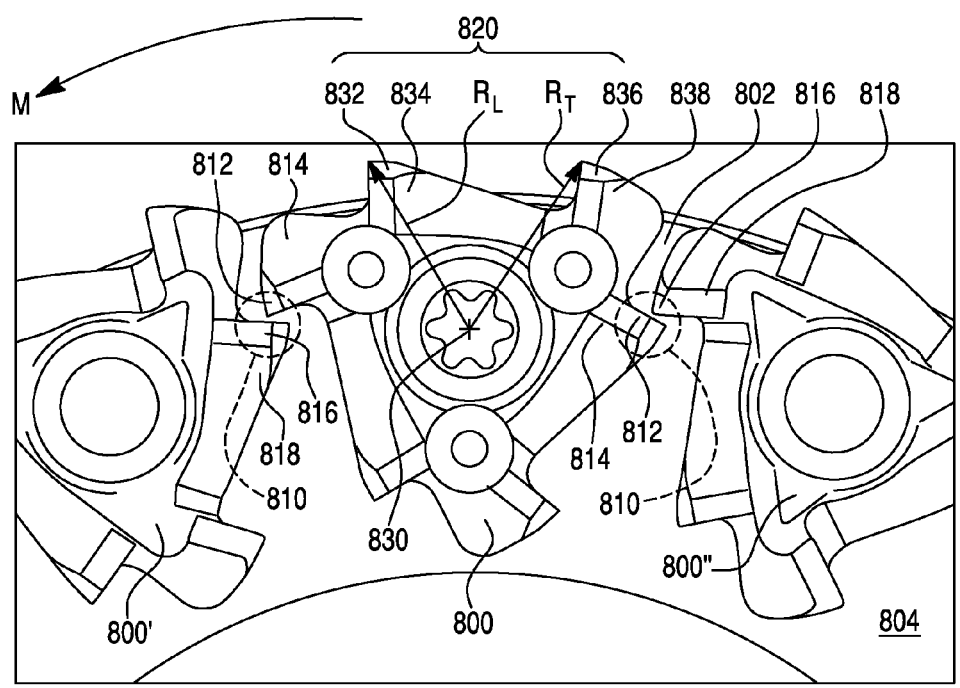
FIG. 25 is a magnified view illustrating exemplary embodiments of cutting inserts positioned in cutting locations of a material removal tool.

FIG. 25 is a magnified view illustrating exemplary embodiments of cutting inserts positioned in cutting locations of a material removal tool. The cutting inserts are as shown and described in regards to the cutting insert 700 in FIG. 24. Further illustrated in FIG. 25 is the spatial relationship of the cutting insert 800 to an adjacent cutting insert, either a leading cutting insert 800' or trailing cutting insert 800" (relative to the direction of motion M of the cutting insert when mounted on the machine tool). That is, a first cutting insert 800 is circumferentially adjacent a second cutting insert 800' or 800" on the periphery 802 of the working face 804, or is circumferentially adjacent two cutting inserts 800' and 800". In these positions, there are portions of the cutting insert 800 that overlap, in a radial direction, a portion of the leading cutting insert 800' and a portion of the trailing cutting insert 800". In exemplary embodiments, the overlapping portions are portions of the cutting insert that are not in the indexed or active position, i.e., are a non-active portion.

For example and as shown in FIG. 25, overlapping occurs in regions 810. In regions 810, at least a portion 812 of one cutting tooth 814 of the first cutting insert 800 radially overlaps, relative to the tool axis (not shown), at least a portion 816 of one cutting tooth 818 of a second cutting insert 800' or 800". However and as shown in FIG. 25, none of the overlapping cutting teeth 814, 818 are on the indexable edge 820 of the cutting insert 800 that is oriented toward the periphery 802 of the working face 804, e.g., none are in the active, indexed position.

The overlapping portions can be any suitable non-active portion of the cutting insert. In exemplary embodiments, the at least one cutting tooth of the first cutting insert is a trailing tooth and the at least one cutting tooth of the second cutting insert is a leading tooth. Thus and in reference to FIG. 25, one can observe that the one cutting tooth 814 of the first cutting insert 800 is a trailing tooth of that non-active indexable edge and the one cutting tooth 818 of the second cutting insert 800' or 800" is a leading tooth of that non-active indexable edge. In exemplary embodiments, the radially overlapping portions include the cutting planes.

Another spatial relationship of the cutting insert 800 observable in FIG. 25 is the distance of each radial edge of the cutting teeth on the indexed indexable edge 820 from the mounting axis 830 of the cutting insert 800. In FIG. 25, it is seen that the radial edge 832 of the leading cutting tooth 834 is at a radial distance of $R_L$ while the radial edge 836 of the trailing cutting tooth 838 is at a radial distance of $R_T$. Radial distance $R_L$ does not equal radial distance $R_T$.

Figure 26:
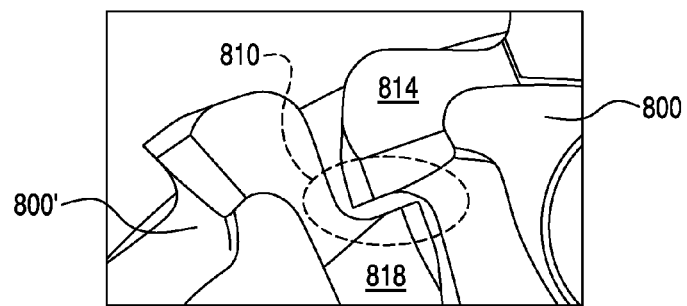
FIG. 26 is a further magnified view of one overlapping region between circumferentially adjacent cutting inserts.

FIG. 26 is a further magnified view of one overlapping region 810 between circumferentially adjacent cutting inserts 800, 800'. Here, an alternative exemplary embodiment is shown where substantially the entire one cutting tooth 814 of the first cutting insert 800 radially overlaps, relative to the tool axis (not shown), substantially the entire one cutting tooth 818 of a leading cutting insert 800', where substantial overlap includes at least the cutting plane of the respective cutting tooth. The same can be described for the overlap between the cutting insert 800 and the trailing cutting insert 800".

Figure 27:
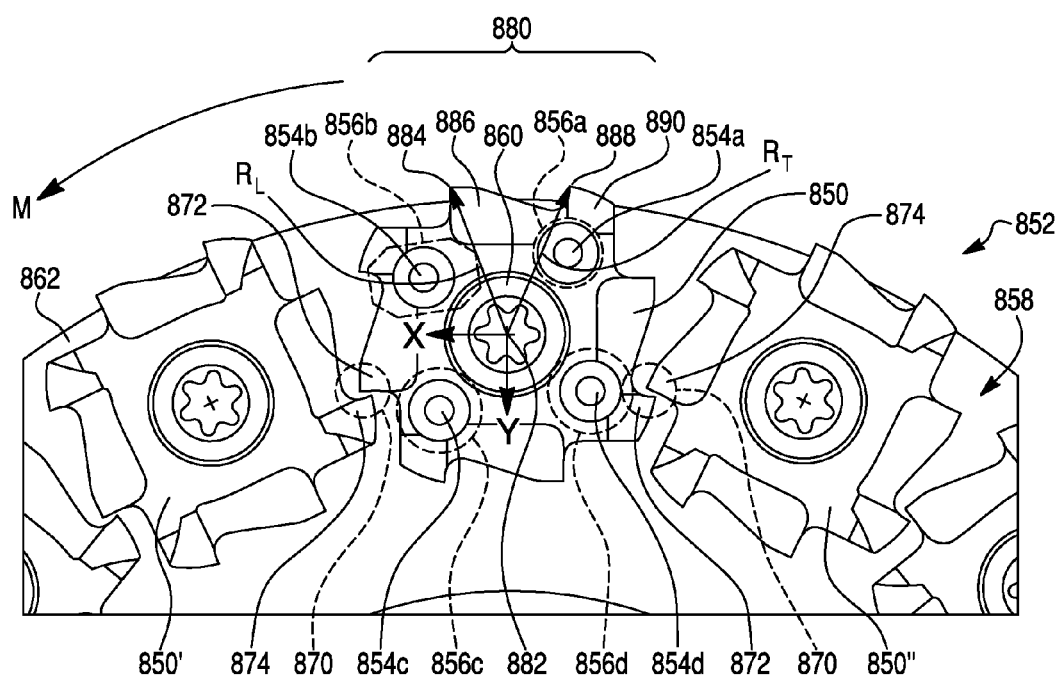
FIG. 27 is an idealized view of a cutting insert showing an exemplary embodiment of a mating system where the cutting insert has four indexable sides.

FIG. 27 is an idealized view of a cutting insert showing the mating system where the cutting insert has four indexable sides. In FIG. 26, the cutting insert 850 is in a cutting location on the tool body 852. The cutting insert 850 is semi-transparent to allow viewing of both the locating means 854 projecting from, in this exemplary embodiment, a plane of a lower face of the cutting insert 850 and the plurality of receivers 856 distributed about the mounting hole in the working face 858. The exemplary embodiment in FIG. 27 has four sets of cooperating locating means 854 and receivers 856. In FIG. 26, the head of the mounting connector 860 is visible in the mounting hole.

For purposes of discussion, the four shown locating means 854 are referred to and labeled as 854a, 854b, 854c and 854d; likewise the three shown receivers 856 (depicted by dashed lines in FIG. 27) are referred to and labeled as 856a, 856b, 856c and 856d. The locating means 854 that cooperate with and mate with the receiver 856 have the same alphabetic suffix. Of course the cutting insert 850 is indexable, so upon indexing the alphabetic suffix designation of any one of the locating means 854 will change in a manner that corresponds to the indexing. Also for purposes of discussion, an orthogonal set of axes are shown (where the Z-axis projects out of the plane of the paper). As referred to below, the orthogonal set of axes are centered on the mounting axis of the mounting hole in the working face 858 for the mounting connector 860.

As seen in FIG. 27, the locating means 854 are uniformly shaped (in this exemplary embodiment, in the form of a hemispherically-shaped structures) and the receivers 856 are not uniformly shaped. The shape and size relationship between the correlated locating means 854 and receivers 856 fixes various degrees of freedom.

For example, a first receiver 856a is a cavity that is, in exemplary embodiments, substantially circular and has a diameter that is substantially the same as the diameter of the hemispherically-shaped structure of the first locating means 854a at the desired depth of penetration of the first locating means 854a into the first receiver 856a, i.e., the diameter of the circle designated by the contact of the hemispherically-shaped structure with the periphery of the cavity of the first receiver. When the first locating means 854a is positioned in the first receiver 856a, several degrees of freedom are consequentially fixed. Both linear translation of the insert 850 in the X-axis and in the Y-axis is prevented. Also, linear translation of the insert 850 in the Z-axis (normal to plane X-Y) (outside of removing the insert from the cutting location) is prevented.

Also for example, a second receiver 856b is a cavity that, in exemplary embodiments, has substantially parallel sides and semicircular joining ends. The separation distance between the parallel sides and the size of the diameter of the semi-circular ends are, in exemplary embodiments, substantially the same as the diameter of the hemispherically-shaped structure of the second locating means 854b at the desired depth of penetration of the second locating means 854b into the second receiver 856b. Further, the cavity of the second receiver 856b can be viewed as an elongated slot with a semi-circular cross-section. The shape and orientation of the second receiver 856b allows for self-location of the second locating means 854b and accommodates manufacturing tolerances in the position of the second locating means 854b on the insert 850. When the second locating means 854b is positioned in the second receiver 856b (and in view of the positioning of the first locating means 854a above), two further degrees of freedom are consequentially fixed—both rotation of the insert 850 about the Y-axis and about the Z-axis are prevented.

In additional example, a third receiver 856c is a cavity that, in exemplary embodiments, is substantially circular (or slightly elliptical) and has a diameter (or length of both a major axis and a minor axis) that is greater than the diameter of the hemispherically-shaped structure of the third locating means 854c at the desired depth of penetration of the third locating means 854c into the third receiver 856c. It is contemplated that the third locating means 854c may not have any contact with the periphery or mouth of the third receiver 856c, but rather that the third locating means 854c projects into the third receiver 856c until it contacts a portion of the bottom of the third receiver 856c. When the third locating means 854c is positioned in the third receiver 856c (and in view of the positioning of the first locating means 854a and the second locating means 854b above), a further degree of freedom is consequentially fixed—rotation of the insert 850 about the X-axis is prevented.

In further example, a fourth receiver 856d is a cavity that, in exemplary embodiments, is substantially circular (or slightly elliptical) and has a diameter (or length of both a major axis and a minor axis) that is greater than the diameter of the hemispherically-shaped structure of the fourth locating means 854d at the desired depth of penetration of the fourth locating means 854d into the fourth receiver 856d. It is contemplated that the fourth locating means 854d may not have any contact with the periphery or mouth of the fourth receiver 856d, but rather that the fourth locating means 854d projects into the fourth receiver 856d until it contacts a portion of the bottom of the fourth receiver 856d. The fourth receiver 856d is redundant for fixing any of the degrees of freedom, but is provided to allow indexing of the insert 850.

Based on the role the differently shaped receivers play (in cooperation with the locating means) in positioning the insert 850, they can also be referred to as (i) a locating receiver (856a), (ii) an aligning receiver (856b), and (iii) a supporting receiver (856c).

Also, the axis of the individual locating means 854, e.g., the axis in the Z-direction in FIG. 27, can be joined in the X-Y plane to trace a polygon. This polygon is a regular polygon having the same number of sides as does the insert 850 itself, e.g., both have four sides in the exemplary embodiment in FIG. 27. This polygon is slightly rotated in the X-Y plane about the orthogonal set of axes (where the Z-axis projects out of the plane of the paper) centered on the mounting axis of the mounting hole in the working face 858 for the mounting connector 860.

Further illustrated in FIG. 27 is the spatial relationship of the cutting insert 850 to an adjacent cutting insert, either a leading cutting insert 850' or trailing cutting insert 850" (relative to the direction of motion M of the cutting insert when mounted on the machine tool). That is, a first cutting insert 850 is circumferentially adjacent a second cutting insert 850' or 850" on the periphery 862 of the working face 858, or is circumferentially adjacent two cutting inserts 850' and 850". In these positions, there are portions of the cutting insert 850 that overlap, in a radial direction, a portion of the leading cutting insert 850' and a portion of the trailing cutting insert 850". In exemplary embodiments, the overlapping portions are portions of the cutting insert that are not in the indexed or active position, i.e., are a non-active portion.

For example and as shown in FIG. 27, overlapping occurs in regions 870. In regions 870, at least a portion of one cutting tooth 872 of the first cutting insert 850 radially overlaps, relative to the tool axis (not shown), at least a portion of one cutting tooth 874 of a second cutting insert 850' or 850". However and as shown in FIG. 27, none of the overlapping cutting teeth 872, 874 are on the indexable edge 880 of the cutting insert 850 that is oriented toward the periphery 862 of the working face 858, e.g., none are in the active, indexed position.

The overlapping portions can be any suitable non-active portion of the cutting insert. In exemplary embodiments, the at least one cutting tooth of the first cutting insert is a trailing tooth and the at least one cutting tooth of the second cutting insert is a leading tooth. Thus and in reference to FIG. 25, one can observe that the one cutting tooth 814 of the first cutting insert 800 is a trailing tooth of that non-active indexable edge and the one cutting tooth 818 of the second cutting insert 800' or 800" is a leading tooth of that non-active indexable edge. In exemplary embodiments, the radially overlapping portions include the cutting planes.

Another spatial relationship of the cutting insert 850 observable in FIG. 27 is the distance of each radial edge of the cutting teeth on the active indexable edge 880 from the mounting axis 882 of the cutting insert 850. In FIG. 27, it is seen that the radial edge 884 of the leading cutting tooth 886 is at a radial distance of $R_L$ while the radial edge 888 of the trailing cutting tooth 890 is at a radial distance of $R_T$. Here, radial distance $R_L$ is approximately equal radial distance $R_T$.

Figure 28:
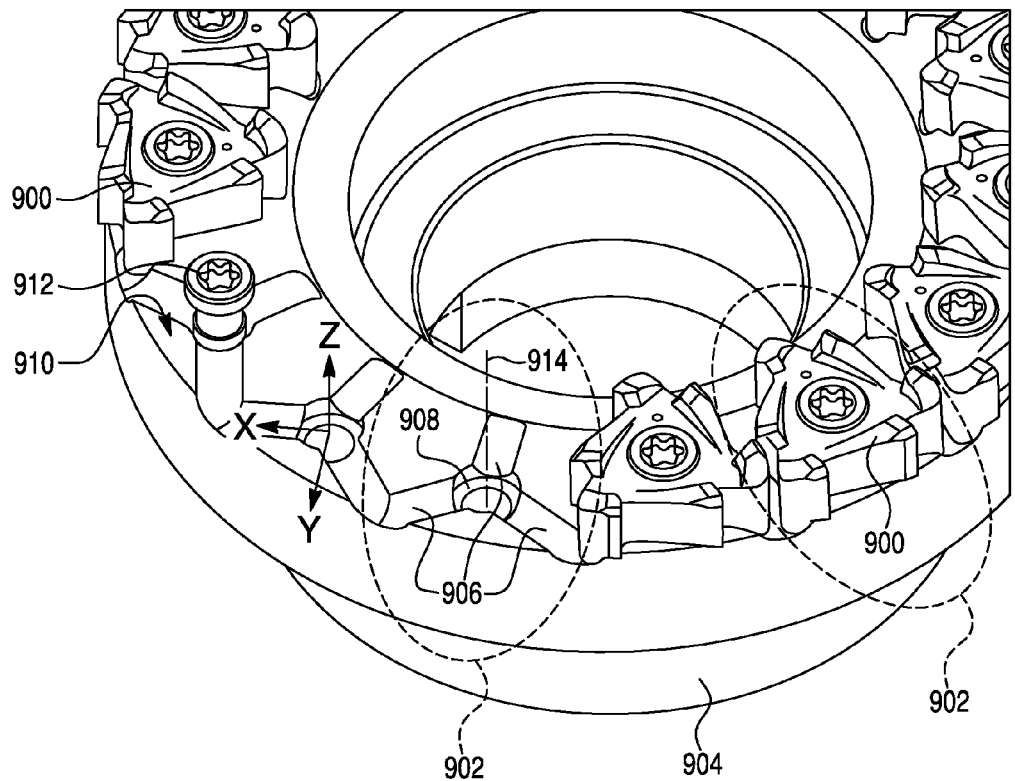
FIG. 28 shows some of the features of an exemplary embodiment of a mating system for a cutting insert employing locating means in the form of a rail-shaped structure.

Reference is made to FIG. 28 for a description of the mating system for a cutting insert employing locating means in the form of a rail-shaped structure. In FIG. 28, the cutting insert 900 is in a cutting location 902 on the tool body 904. The cutting insert 900 in the exemplary embodiment has locating means substantially in the form of a rail-shaped structure, as shown and described in FIG. 10, but any of the rail-shaped structures disclosed herein can be used as long as the receivers on the working face are of suitable complimentary shape, number and position. The locating means project from, in this exemplary embodiment, a plane of a lower face of the insert 900 In the exemplary embodiment, each cutting location 902 includes a plurality of receivers 906 distributed about the mounting hole 908 in the working face 910. In FIG. 28, an example of a mounting connector 912 is visible in a mounting hole 908. The mounting hole 908 has a mounting axis 914.

For purposes of discussion, the three locating means on the cutting insert 900 are referred to as first locating means, second locating means and third locating. Also for purposes of discussion, the three receivers are described as the first receiver 906a, the second receiver 906b and the third receiver 906c. The locating means that cooperate with and mate with a receiver 906 has the same numerical designation—first, second or third. Of course the cutting insert 900 is indexable, so upon indexing the numerical designation of the locating means will change in a manner that corresponds to the indexing. The actual designation of these locating means on the cutting insert is not important as during indexing of the cutting insert 900, each of these locating means mates to one of the three shown receivers 906a, 906b, or 906c at one time or another as the various indexable edges of the cutting insert 900 are cycled through the indexed position. Also for purposes of discussion, an orthogonal set of axes are shown, with an X-axis, a Y-axis and a Z-axis. The orthogonal set of axes are centered on the mounting axis 914 of the mounting hole 908 in the working face 910.

Figure 29:
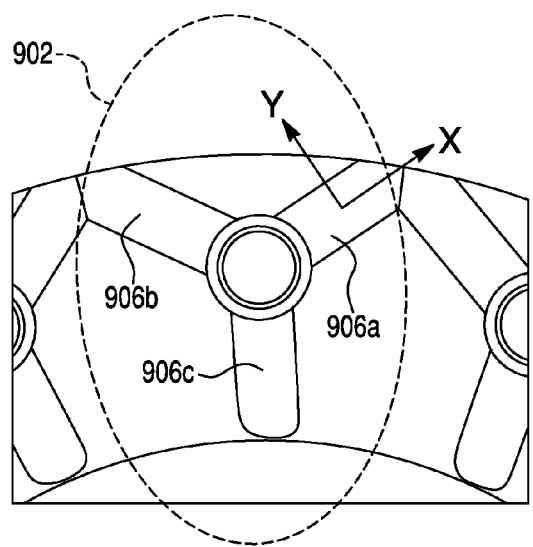
FIG. 29 is a magnified view of a cutting location from FIG. 28, with partial views of adjacent cutting positions.

FIG. 29 is a magnified view of a cutting location from FIG. 28, with partial views of adjacent cutting positions. FIG. 29 is a plan view in the X-Y plane, as evidenced by the orthogonal set of axes (where the Z-axis projects out of the plane of the paper).

In FIG. 29, the three locating means are uniformly shaped (in this exemplary embodiment, in the form of rail-shaped structures) and the three receivers 906 are also uniformly shaped. The shape and size relationship between the correlated locating means and receivers 906 constrains various degrees of freedom.

For example, a first receiver 906a is a cavity that is, in exemplary embodiments, substantially semi-circular in cross-section (i.e., in the Y-plane) and substantially semi-cylindrical in the longitudinal direction (i.e., in the X-plane). The diameter of the semi-circular cross-section is substantially the same as the width of the rail-shaped structure of the first locating means at the desired depth of penetration of the first locating means into the first receiver 906a, i.e., the separation distance between opposing sides of the rail-shaped structure where the rail-shaped structure of the locating means contact the periphery of the cavity of the first receiver. When the first locating means is positioned in the first receiver 906a, several degrees of freedom are consequentially fixed. Both linear translation of the insert 900 in the Z-axis (outside of removing the insert from the cutting location) and in the Y-axis is prevented. Also, rotation of the insert 900 about the Z-axis and the Y-axis are prevented.

Also for example, a second receiver 906b is a cavity that is, in exemplary embodiments, substantially semi-circular in cross-section and substantially semi-cylindrical in the longitudinal direction as is the first receiver 906a (although oriented in a different direction in the X-Y plane). The diameter of the semi-circular cross-section is substantially the same as the width of the rail-shaped structure of the second locating means at the desired depth of penetration of the second locating means into the second receiver 906b, i.e., the separation distance between opposing sides of the rail-shaped structure where the rail-shaped structure of the locating means contact the periphery of the cavity of the first receiver. When the second locating means is positioned in the second receiver 906b (and in view of the positioning of the first locating means above), two further degrees of freedom are consequentially fixed—both translation of the insert 900 in the X-axis and rotation of the insert 900 about the X-axis are prevented.

In additional example, a third receiver 906c is a cavity that is, in exemplary embodiments, substantially semi-circular in cross-section and substantially semi-cylindrical in the longitudinal direction as is the first receiver 906a (although oriented in a different direction in the X-Y plane). The third receiver 906c is redundant for fixing any of the degrees of freedom, but is provided to allow indexing of the insert 900.

Further, the functions discussed for constraining the degrees of freedom in the exemplary embodiment with three locating means uniformly shaped in the form of rail-shaped structures and cooperating receivers shaped in the form of cavities collapses to the functions discussed in the exemplary embodiment with three locating means uniformly shaped in the form of a hemispherically-shaped structures and cooperating non-uniformly shaped receivers when the longitudinal axis of the rib-shaped structure is shortened. Thus, as far as aspects of the mating system that constrain degrees of freedom of the cutting insert, the mating system incorporating locating means uniformly shaped in the form of rail-shaped structures is a special case of the more general mating system incorporating locating means uniformly shaped in the form of a hemispherically-shaped structures.

Figure 30:
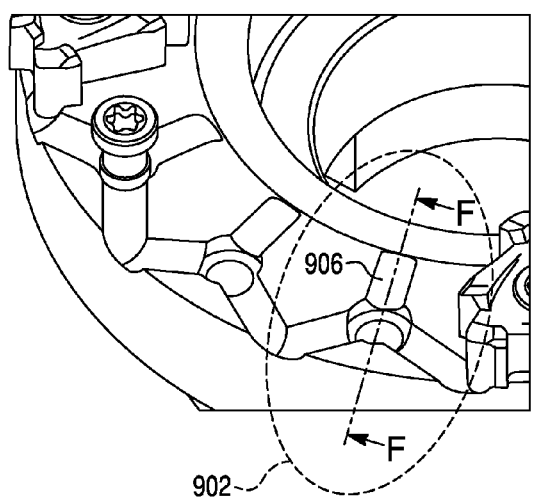
FIGS. 30-32 show an exemplary embodiment of a relief in the receivers.
Figure 31:
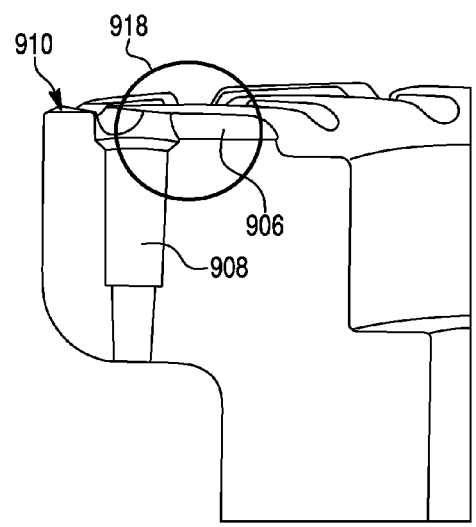
Figure 32:
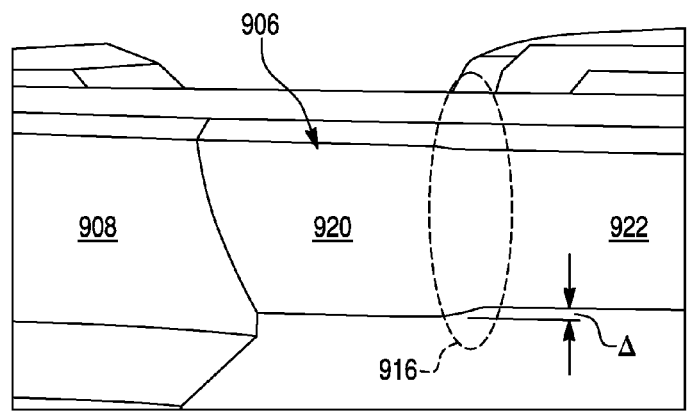

The redundancy of three receivers 906 may play a negative role in positioning the insert 900 due to imperfections and tolerances that are artifacts of the manufacturing of the insert 900, such as pressing and sintering. To minimize these negative effects, the receivers 906 each have a relief 916. FIGS. 30-32 show an exemplary embodiment of a relief 916 in the receivers 906. In this regard, FIG. 30 shows several cutting locations 902 and the location of a cross-section F-F of a receiver 906. FIG. 31 shows a magnified view of the cross-section of receiver 906 as seen along line F-F. FIG. 32 is a magnified view of detail 918 in the cross-section of receiver 906 shown in FIG. 31. As seen in FIG. 32, the radius of the receiver 906 is not uniform along its longitudinal length. Rather, there is a first section 920 and a second section 922 having different radii (or the same radii, but manufactured with the step by, for example, offsetting the center of rotation), which produces a step-like feature at the relief 916 due to the difference (A). The first section 920 is closer to the mounting hole 908 in the working face 910 than is the second section 922. The change in radius provides a relief 916 by minimizing the contact area of, for example, as non-uniform locating means, such as a warped rail-like structure with receivers 906. Although described and shown herein with respect to one receiver, exemplary embodiments of reliefs can be provided in one or more, alternatively all, of the receivers 906.

Figure 33:
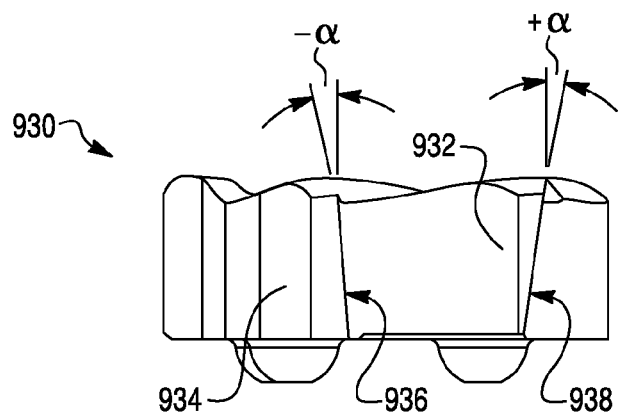
FIG. 33 shows an edge view of an exemplary embodiment of a cutting insert.

Generally, the various corresponding surfaces of the leading cutting tooth and the trailing cutting tooth in exemplary embodiments of the cutting insert are substantially the same in regard to orientation. However, in other exemplary embodiments of the cutting insert, the various corresponding surfaces of the leading cutting tooth and the trailing cutting can be different. FIG. 33 shows an edge view of an exemplary embodiment of a cutting insert 930. In the FIG. 33 view, some of the surfaces of the leading cutting tooth 932 are visible and some of the surfaces of the trailing cutting tooth 934 are visible. The cutting plane 936 of the leading cutting tooth 932 has a positive axial rake angle (+α); the cutting plane 938 of the trailing cutting tooth 934 has a negative axial rake angle (−α). Alternatively, the cutting plane 936 of the leading cutting tooth 932 can have a negative axial rake angle (−α) and the cutting plane 938 of the trailing cutting tooth 934 can have a positive axial rake angle (+α). The mixed axial rake angles on the same indexable edge compensate for the axial forces generated during use of the cutting insert. Further, mixed axial rake angles can also contribute to creating white noise and reducing chatter during use of the cutting insert.

Figure 34:
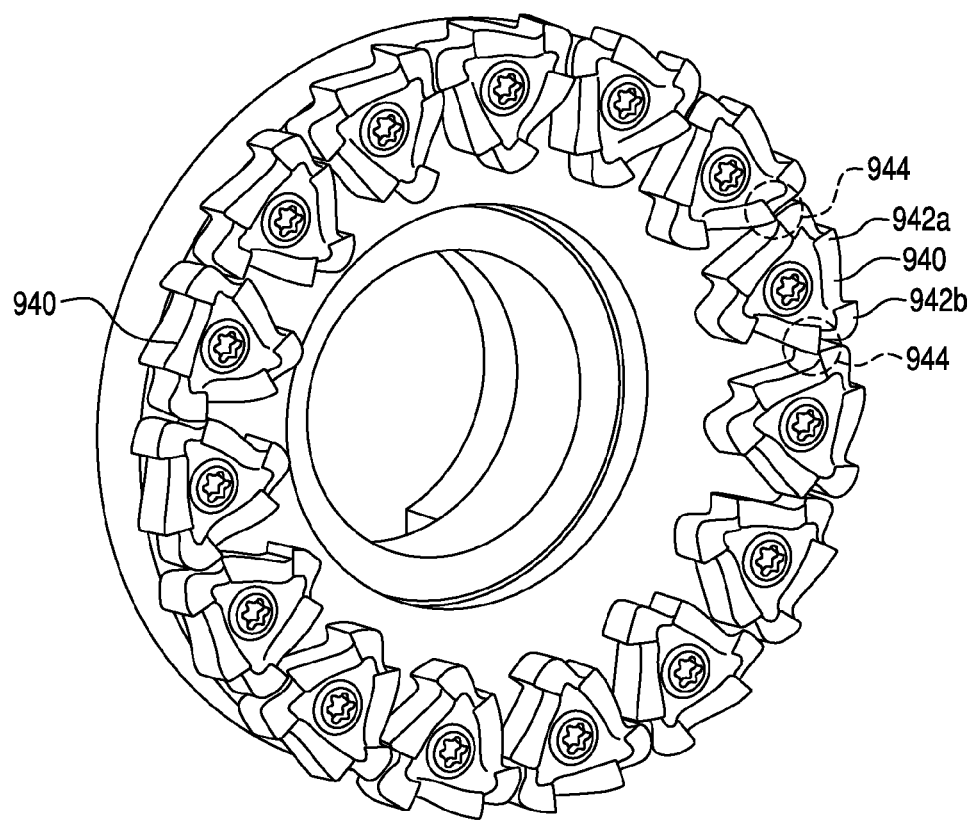
FIG. 34 shows a perspective view of a working face of a tool body on which are arranged in each cutting position exemplary embodiments of cutting inserts.

FIG. 34 shows a perspective view of a working face of a tool body on which are arranged in each cutting position exemplary embodiments of cutting inserts. The cutting inserts 940 each have two cutting teeth 942a, 942b in the active position. Further, a cutting tooth on the non-active indexable edge overlaps with a cutting tooth on the non-active indexable edge of an adjacent cutting insert in the region 944. This arrangement increases the density of cutting teeth in the active position on a per unit length of circumference of the working face. Not all cutting inserts 940, cutting teeth 942a, 942b and regions 944 are labeled in FIG. 34 for viewing clarity.

Figure 35:
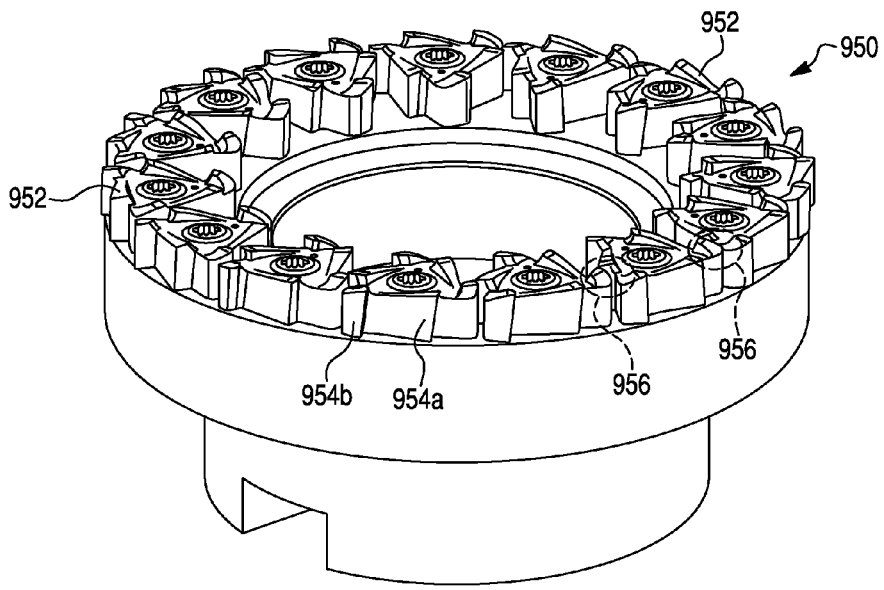
FIG. 35 shows a perspective view of a working face of another tool body on which are arranged in each cutting position exemplary embodiments of cutting inserts.

FIG. 35 shows a perspective view of a working face of another tool body 950 on which are arranged in each cutting position exemplary embodiments of cutting inserts. The cutting inserts 952 each have two cutting teeth 954a, 954b in the active position. Further, a cutting tooth on the non-active indexable edge overlaps with a cutting tooth on the non-active indexable edge of an adjacent cutting insert in the region 956. This arrangement increases the density of cutting teeth in the active position on a per unit length of circumference of the working face. Not all cutting inserts 952, cutting teeth 954a, 954b and regions 956 are labeled in FIG. 35 for viewing clarity.

Figure 36:
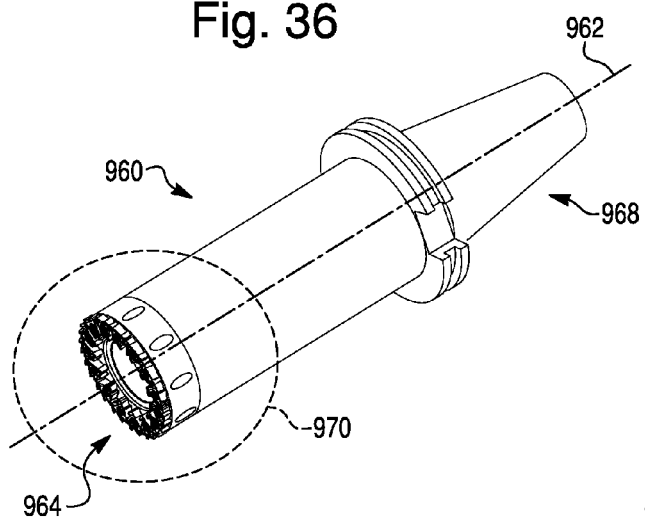
FIG. 36 shows a perspective view of an exemplary embodiment of a material removal tool and, in particular, of a boring bar with internal coolant supply.
Figure 37:
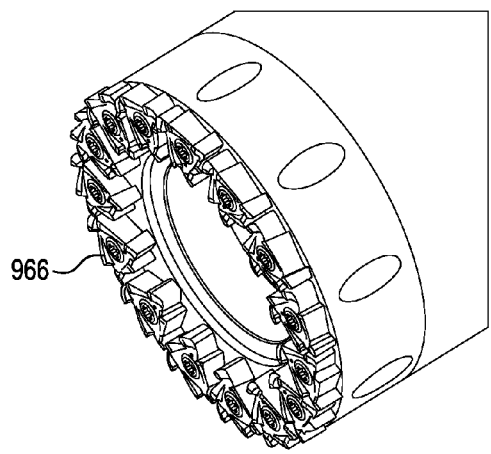
FIG. 37 is a magnified view of region of the material removal tool of FIG. 36.

FIG. 36 shows a perspective view of an exemplary embodiment of a material removal tool 960. Arranged along a tool axis 962 are the working face 964 at a first end. Arranged in each cutting position on the working face are exemplary embodiments of cutting inserts 966. At an opposite end of the tool axis 962 from the working face 964 is a mounting face or other mounting device 968 for attachment to a spindle of a machine tool for rotation about the tool axis 962. FIG. 37 is a magnified view of region 970 of FIG. 36.

Figure 38:
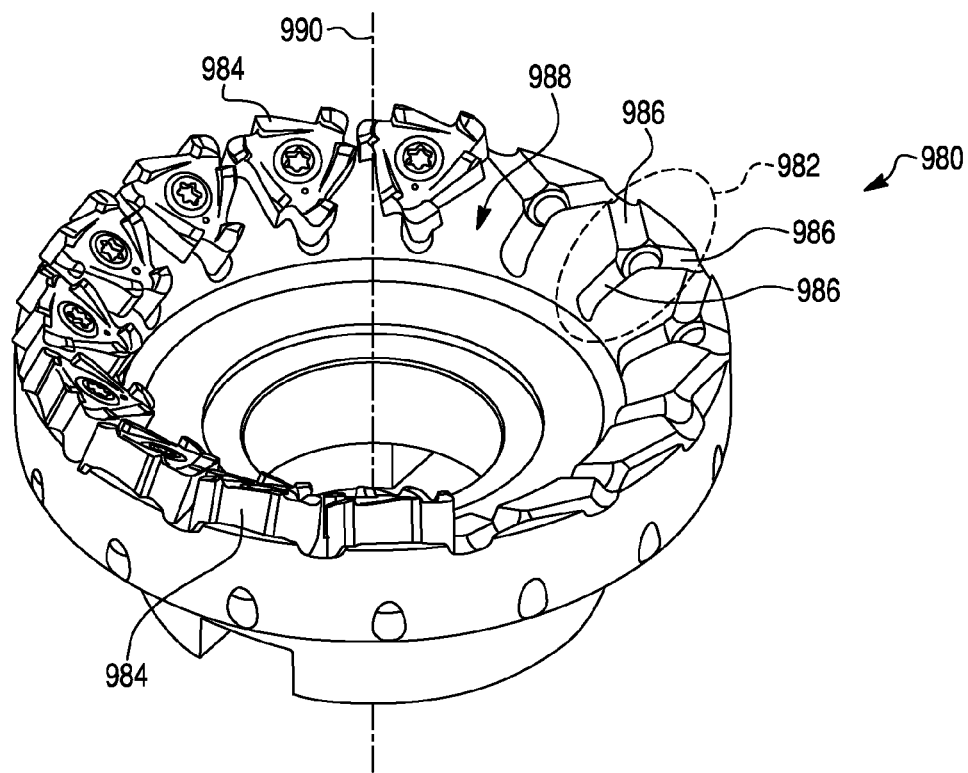
FIG. 38 shows a perspective view of a working face of another tool body on which are arranged in several cutting positions exemplary embodiments of cutting inserts.
Figure 39:
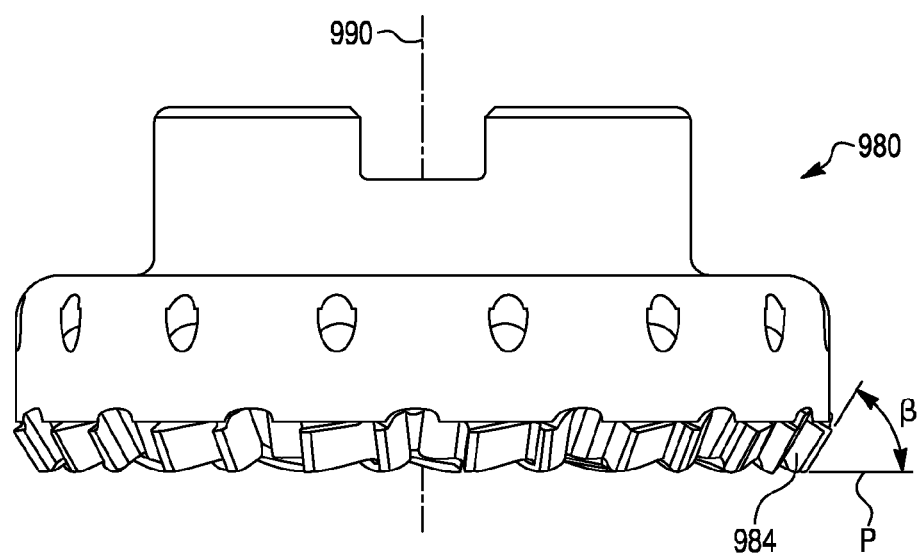
FIG. 39 is an edge view of the tool body in FIG. 38.

FIG. 38 shows a perspective view of a working face of another tool body 980 on which are arranged in several cutting positions 982 exemplary embodiments of cutting inserts 984. Also visible in FIG. 38 in the unoccupied cutting positions are the receivers 986 of the mating system that receive the locating means on the cutting inserts 984. The working face 988 has a pitch relative to a plane (P) perpendicular to the tool axis 990. FIG. 39 is an edge view of the tool body 980 in FIG. 38. As seen in FIG. 38, the pitch is reflected in the orientation of the cutting inserts 984, which place the active, indexable edge of the cutting insert 984 at a corresponding pitch, which is known as a dish angle (β). A suitable dish angle (β) ranges from about 20 degrees to about 70 degrees, alternatively about 30 degrees to about 45 degrees. In FIGS. 38 and 39, the dish angle (β) is receivers 986 in the working face 988. For example, where the locating means are rail-shaped structures, the cavities for the ribs are machined in a way that an imaginary plane created through any of two axis aligned with axes of the rail-shaped locating means generates an angle with the working face. The dish angle prevents spare cutting edges, e.g., the cutting edges on the non-active indexable edges of the cutting inserts, from touching the machined surfaces formed by the active cutting edges.

Figure 40:
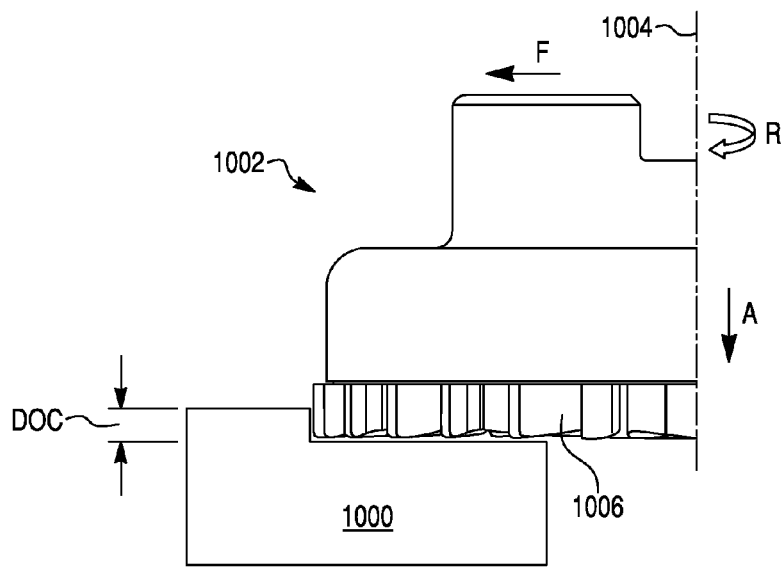
FIG. 40 shows an example of the operation of the material removal tool in an exemplary method to remove material from a workpiece.

Embodiments of disclosed cutting inserts and disclosed material removal tools can be used to remove material from a workpiece. An example of the operation of the material removal tool in an exemplary method is shown in FIG. 40. An exemplary method to remove material from a workpiece 1000 comprises rotating the material removal tool 1002, which is mounted to a spindle of machine tool, about an axis 1004. In FIG. 40, the direction of rotation is shown as R. Cutting inserts 1006, such as those disclosed herein, are mounted on the working face of the material removal tool 1002. The material removal tool 1000 is then feed in direction F at a desired rate to contact the plurality of cutting inserts 1006 to the workpiece 1000. The amount of the side of the cutting inserts that actual contact the workpiece 1000 is controlled by the depth of cut (DOC). After one pass in the feed direction F, the material removal tool 1000 can be translated axially (A) and another pass made of the workpiece 1000 to remove additional material.

Figure 41A:
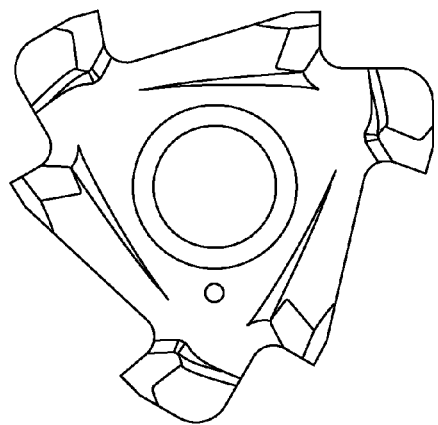
FIGS. 41A to 41B show, in plan view from above, exemplary embodiments of cutting inserts designed for use in cutting locations on counter-clockwise rotating material removal tools (FIG. 41A) and designed for use in cutting locations on clockwise rotating material removal tools (FIG. 41B).
Figure 41B:
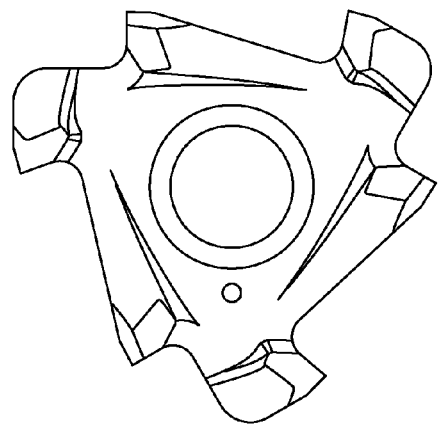

The exemplary embodiments of cutting inserts shown in the figures have been, as seen in plan view from above as in FIG. 41A, designed for use in cutting locations on counter-clockwise rotating material removal tools. However, the structures, methods and principles disclosed herein can also be used in cutting inserts designed for use in cutting locations on clockwise rotating material removal tools. An example of a cutting insert designed for use in cutting locations on clockwise rotating material removal tools is shown in FIG. 41B.

Exemplary embodiments disclosed herein provide several advantages over conventional cutting inserts, material removal tools, mating systems and methods of machining. For example, increasing the amount of indexes of the insert can lower the cost per index. The asymmetric design of the insert can allow a higher density of positioning of cutting inserts on the circumference of the working face. The mating system provides more accurate positioning of the cutting insert, reduces the weight of the cutter body, reduces the cost of the cutter body, and reduces the time for delivery of cutters. Finally, creating locating means on one or both sides of the cutting insert eliminates the necessity for vertical or angular sidewalls.

Although shown and described herein with locating means projecting outward from cutting insert and receivers being a cavity or projecting inward, the principals and embodiments disclosed herein can be embodied in a mating system in which the locating means on the cutting inserts project inward and receivers on the working face of the tool body project outward.

Although described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. An indexable cutting insert, comprising:
    a body including an upper face opposing a lower face and side edges joining the upper face to the lower face, at least two side edges each defining an indexable edge of the insert;
    a mounting hole extending through the body from the upper face to the lower face;
    at least two cutting teeth on each indexable edge; and
    locating means projecting from at least one of a plane of the upper face and a plane of the lower face,
    wherein each of the at least two cutting teeth includes a cutting plane meeting a side clearance surface at a radial edge and meeting a face clearance surface at a face edge, and a corner surface connecting the side clearance surface and the face clearance surface,
    wherein the at least two cutting teeth include a leading tooth and a trailing tooth and
    wherein a perpendicular distance from a line bisecting both the mounting hole and at least one of the locating means to the radial edge of the leading tooth is different from a perpendicular distance from the line bisecting both the mounting hole and at least one of the locating means to the radial edge of the trailing tooth.

2. The indexable cutting insert of claim 1, wherein the locating means include at least one substantially hemispherically-shaped structure.

3. The indexable cutting insert of claim 2, wherein centers of the locating means are at a common radial distance from an axis of the cutting insert located at a center of the mounting hole.

4. The indexable cutting insert of claim 2, wherein the locating means include three substantially hemispherically-shaped structures.

5. The indexable cutting insert of claim 1, wherein the locating means include at least one substantially polyhedra-shaped structure.

6. The indexable cutting insert of claim 5, wherein the locating means include three substantially polyhedra-shaped structures.

7. The indexable cutting insert of claim 1, wherein the locating means include at least one substantially rail-shaped structure.

8. The indexable cutting insert of claim 7, wherein a cross-sectional shape of the substantially rail-shaped structure is semi-circular, semi-polyhedral, or semi-elliptical.

9. The indexable cutting insert of claim 8, wherein the locating means include three substantially rail-shaped structures.

10. The indexable cutting insert as in claim 1, wherein the locating means project from both the plane of the upper face and the plane of the lower face.

11. The indexable cutting insert of claim 1, wherein the side clearance surface includes a primary land and a second land.

12. The indexable cutting insert of claim 1, wherein the radial edge of the leading tooth and the radial edge of the trailing tooth are located at different radial distances relative to an axis of the cutting insert located at a center of the mounting hole.

13. The indexable cutting insert of claim 1, wherein the radial edge of the leading tooth and the radial edge of the trailing tooth on one indexable edge both lie on a circumference of a circle.

14. The indexable cutting insert of claim 13, wherein the circles associated with the radial edges of the cutting teeth on different indexable edges have the same diameter and are located at a different center point, wherein the center point is radially offset from an axis of the cutting insert located at a center of the mounting hole.

15. The indexable cutting insert of claim 1, wherein each face edge is oriented at a non-zero dish angle and each radial edge is oriented at a lead angle less than 90 degrees.

16. The indexable cutting insert of claim 1, wherein the face clearance surface of each cutting tooth projects above the plane of the upper face.

17. The indexable cutting insert of claim 1, wherein the mounting hole is adapted to receive a mounting connector to mount the indexable cutting insert on a material removal tool.

18. The indexable cutting insert of claim 1, wherein the indexable insert is a milling insert, a boring insert, a drilling insert, or a turning insert.

19. A material removal tool, comprising:
    a tool body having, along a longitudinal tool axis, a working face opposing a mounting face, the mounting face mountable to a spindle of a machine tool for rotation about the tool axis and the working face having a periphery;
    a plurality of cutting inserts mounted on the working face via a mounting hole in the working face having a mounting axis, the cutting inserts including at least two side edges each defining an indexable edge of the insert, at least two cutting teeth on each indexable edge, and a plurality of locating means projecting from at least one of a plane of an upper face of the cutting insert and a plane of a lower face of the insert; and a plurality of cutting locations on the working face, each cutting location having a plurality of receivers distributed about the mounting hole and engaged by the plurality of locating means, wherein the at least two cutting teeth include a leading tooth and a trailing tooth, and wherein a perpendicular distance from a line bisecting both the mounting hole and at least one of the locating means to a radial edge of the leading tooth is different from a perpendicular distance from the line bisecting both the mounting hole and at least one of the locating means to a radial edge of the trailing tooth.

20. The material removal tool of claim 19, wherein the receivers are cavities in the working face and wherein the plurality of receivers of each cutting location includes at least two cavities varying in at least one of geometry and size.

21. The material removal tool according to claim 19, wherein the cutting inserts are indexable about the mounting axis and each locating means has one of a geometry and a size to engage with each of the plurality of cavities as the cutting insert is indexed.

22. The material removal tool of claim 19, wherein the plurality of receivers at each cutting location includes three cavities in the working face, wherein a first cavity is circular with a first radius, a second cavity is a slot with substantially parallel sides and semicircular joining ends, and a third cavity is circular with a second radius, the second radius larger than the first radius.

23. The material removal tool of claim 19, wherein the locating means include substantially hemispherically-shaped structures or substantially polyhedra-shaped structures.

24. The material removal tool of claim 23, wherein receivers are cavities in the working face, wherein each cutting location includes at least two cavities, and wherein, at each cutting location, each locating means engages with a different one of the plurality of cavities.

25. The material removal tool of claim 24, wherein engagement between a first one of the plurality of locating means and a first one of the cavities eliminates linear translation of the cutting insert in an X-axis and linear translation of the cutting insert in a Y-axis, relative to an orthogonal coordinate system centered on the mounting axis of the mounting hole in the working face.

26. The material removal tool of claim 25, wherein engagement between a second one of the plurality of locating means and a second one of the cavities eliminates rotation of the cutting insert about the Y-axis and eliminates rotation of the cutting insert about a Z-axis, relative to the orthogonal coordinate system centered on the mounting axis of the mounting hole in the working face.

27. The material removal tool of claim 26, wherein engagement between a third one of the plurality of locating means and a third one of the cavities eliminates rotation of the cutting insert about the X-axis, relative to the orthogonal coordinate system centered on the mounting axis of the mounting hole in the working face.

28. The material removal tool of claim 24, wherein engagement between a first one of the plurality of locating means and a first one of the cavities constrains three degrees of linear freedom of movement of the cutting insert.

29. The material removal tool of claim 28, wherein engagement between a second one of the plurality of locating means and a second one of the cavities constrains two degrees of rotational freedom of movement of the cutting insert.

30. The material removal tool of claim 19, wherein the locating means includes at least one substantially rail-shaped structure.

31. The material removal tool of claim 30, wherein a cross-sectional shape of the substantially rail-shaped structure is semi-circular, semi-polyhedral, or semi-elliptical.

32. The material removal tool of claim 30, wherein receivers are troughs in the working face, wherein each cutting location includes at least two troughs, and wherein each locating means engages with a different one of the plurality of troughs.

33. The material removal tool of claim 32, wherein each trough has a trough axis oriented radially relative to the mounting axis with a radially innermost end toward the mounting hole of the cutting insert and a radially outermost end toward a periphery of the cutting insert.

34. The material removal tool of claim 33, wherein a first portion of the trough at the radially innermost end has a relief feature with a first radial depth relative to the trough axis that is larger than a second radial depth relative to the trough axis of a second portion of the trough at the radially outermost end.

35. The material removal tool of claim 32, wherein engagement between a first one of the plurality of locating means and a first one of the at plurality of troughs eliminates linear translation of the cutting insert in a Z-axis, eliminates rotational translation of the cutting insert about an X-axis, eliminates rotation of the cutting insert about a Y-axis, and eliminates rotation of the cutting insert about the Z-axis, relative to an orthogonal coordinate system centered on the mounting axis.

36. The material removal tool of claim 35, wherein engagement between a second one of the plurality of locating means and a second one of the plurality of troughs eliminates linear translation of the cutting insert in the X-axis and eliminates linear translation of the cutting insert in the Y-axis, relative to the orthogonal coordinate system centered on the mounting axis of the mounting hole in the working face.

37. The material removal tool of claim 32, wherein engagement between a first one of the plurality of locating means and a first one of the plurality of troughs constrains one degree of linear freedom of movement of the cutting insert and constrains three degrees of rotational freedom of movement of the cutting insert.

38. The material removal tool of claim 37, wherein engagement between a second one of the plurality of locating means and a second one of the plurality of troughs constrains two degrees of linear freedom of movement of the cutting insert.

39. The material removal tool of claim 19, wherein a radial edge of the leading tooth and a radial edge of the trailing tooth are located at different radially distances relative to the mounting axis of the cutting insert.

40. The material removal tool of claim 19, wherein a radial edge of the leading tooth and a radial edge of the trailing tooth on each indexable edge both lie on a circumference of a circle.

41. The material removal tool of claim 40, wherein the circles associated with the cutting teeth on different indexable edges have the same diameter and are located at a different center point, wherein the center point is radially offset from the mounting axis of the cutting insert.

42. The material removal tool of claim 19, wherein a radial edge of the leading tooth and a radial edge of the trailing tooth on each indexable edge that is oriented toward the periphery of the working face both lie on a circumference of a common circle.

43. A material removal tool, comprising:
a tool body having, along a longitudinal tool axis, a working face opposing a mounting face, the mounting face mountable to a spindle of a machine tool for rotation about the tool axis and the working face having a periphery;
a plurality of cutting inserts mounted on the working face via a mounting hole in the working face having a mounting axis, the cutting inserts including at least two side edges each defining an indexable edge of the insert, at least two cutting teeth on each indexable edge, and a plurality of locating means projecting from at least one of a plane of an upper face of the cutting insert and a plane of a lower face of the insert; and
a plurality of cutting locations on the working face, each cutting location having a plurality of receivers distributed about the mounting hole and engaged by the plurality of locating means,
wherein the at least two cutting teeth include a leading tooth and a trailing tooth,
wherein a perpendicular distance from a line bisecting both the mounting hole and at least one of the locating means to a radial edge of the leading tooth is different from a perpendicular distance from the line bisecting both the mounting hole and at least one of the locating means to a radial edge of the trailing tooth, and
wherein a first cutting insert is circumferentially adjacent a second cutting insert on the periphery of the working face and wherein at least a portion of one inactive cutting tooth of the first cutting insert radially overlaps, relative to the tool axis, at least a portion of one inactive cutting tooth of the second cutting insert.

44. The material removal tool of claim 43, wherein none of the overlapping cutting teeth are on the indexable edge of the cutting insert that is oriented toward the periphery of the working face.

45. The material removal tool of claim 43, wherein the at least one cutting tooth of the first cutting insert is a trailing tooth and the at least one cutting tooth of the second cutting insert is a leading tooth.

46. The material removal tool of claim 45, wherein a cutting plane on the trailing tooth faces a cutting plane on the leading tooth.

47. The material removal tool of claim 46, wherein the radially overlapping portions include the cutting planes.

48. A method to remove material from a workpiece, the method comprising
rotating a material removal tool mounted to a spindle of machine tool; and
removing material from the workpiece by contacting a plurality of cutting inserts mounted at on a working face of the material removal tool to the workpiece,
wherein the material removal tool includes a tool body having, along a longitudinal tool axis, the working face opposing a mounting face, the mounting face mountable to the spindle of the machine tool for rotation about the tool axis and the working face having a periphery,
wherein the plurality of cutting inserts are mounted on the working face via a mounting hole having a mounting axis,
wherein the cutting inserts include at least two side edges each defining an indexable edge of the insert, at least two cutting teeth on each indexable edge, and a plurality of locating means projecting from at least one of a plane of an upper face of the cutting insert and a plane of a lower face of the insert,
wherein a plurality of cutting locations on the working face each have a plurality of receivers distributed about the mounting hole and engaged by the plurality of locating means, and
wherein a first cutting insert is circumferentially adjacent a second cutting insert on the periphery of the working face and wherein at least a portion of one inactive cutting tooth of the first cutting insert radially overlaps, relative to the tool axis, at least a portion of one inactive cutting tooth of the second cutting insert.

49. The method of claim 48, wherein the receivers are cavities in the working face and wherein the plurality of receivers of each cutting location includes at least two cavities varying in at least one of geometry and size.

50. The method according to claim 48, wherein the cutting inserts are indexable about the mounting axis and each of the plurality of locating means engages with each of the plurality of receivers as the cutting insert is indexed.

51. The method of claim 48, wherein the plurality of receivers includes three cavities in the working face, wherein a first cavity is circular with a first radius, a second cavity is a slot with substantially parallel sides and semicircular joining ends, and a third cavity is circular with a second radius, the second radius larger than the first radius.

52. The method of claim 48, wherein engagement between a first one of the plurality of locating means and a first one of the plurality of receivers constrains three degrees of linear freedom of movement of the cutting insert.

53. The method of claim 52, wherein engagement between a second one of the plurality of locating means and a second one of the plurality of receivers constrains two degrees of rotational freedom of movement of the cutting insert.

54. The method of claim 48, wherein the locating means includes at least one substantially rail-shaped structure, wherein the receivers are troughs in the working face, wherein each cutting location includes at least two troughs, and wherein each locating means engages with a different one of the plurality of troughs.

55. The method of claim 54, wherein engagement between a first one of the plurality of locating means and a first one of the plurality of receivers constrains one degree of linear freedom of movement of the cutting insert and constrains three degrees of rotational freedom of movement of the cutting insert.

56. The method of claim 55, wherein engagement between a second one of the plurality of locating means and a second one of the plurality of receivers constrains two degrees of linear freedom of movement of the cutting insert.

57. The method of claim 48, wherein the at least two cutting teeth include a leading tooth and a trailing tooth.

58. A mating system for mounting a cutting insert on a working face of a body of a material removal tool, the mating system comprising:
at least three pairs of cooperating projections and cavities, one of the cooperating projections and cavities in any one pair on the cutting insert and the other of the cooperating projections and cavities in the one pair on the body of the material removal tool,
wherein at least five degrees of freedom of the cutting insert are constrained by two pairs of cooperating projections and cavities with at least two cutting teeth in an active, indexed position, the two cutting teeth on the same side edge of the cutting insert, wherein a radial edge of each of the at least two cutting teeth in the active indexed position are located on a common circumference of a circle centered on an axis of rotation of the material removal tool, and wherein a first cutting insert is circumferentially adjacent a second cutting insert on the periphery of the working face and wherein at least a portion of one inactive cutting tooth of the first cutting insert radially overlaps, relative to the tool axis, at least a portion of one inactive cutting tooth of the second cutting insert.

59. The mating system of claim 58, wherein at least six degrees of freedom of the cutting insert are constrained by the two pairs of cooperating projections and cavities.

60. The mating system of claim 58, wherein the cutting insert has three side edges that can each be indexed into the active, indexed position.

61. The mating system of claim 58, wherein the cutting insert has four side edges that can each be indexed into the active, indexed position.

* * * * *